United States Patent [19]

Muller et al.

[11] Patent Number: 5,748,301
[45] Date of Patent: May 5, 1998

[54] DEVICE AND PROCESS FOR THE GEOMETRIC INSPECTION OF WHEELED VEHICLES

[75] Inventors: Patrice Muller, Chartres; Paul Coetsier, Pomponne; Denis Douine, Lagny Sur Marne, all of France

[73] Assignee: Muller BEM, Chartres, France

[21] Appl. No.: 431,410

[22] Filed: Apr. 28, 1995

[30] Foreign Application Priority Data

Apr. 28, 1994 [FR] France .................... 94 05159

[51] Int. Cl.[6] .................... G01B 11/26; G01B 11/275
[52] U.S. Cl. .................... 356/155; 33/286; 33/288
[58] Field of Search .................... 356/152–155; 33/288; 364/550, 551.01, 506, 552, 559; 395/153–155, 600; 434/373–375

[56] References Cited

U.S. PATENT DOCUMENTS

| | | | |
|---|---|---|---|
| 4,126,943 | 11/1978 | Senften | 33/288 |
| 4,154,531 | 5/1979 | Roberts, Jr. et al. | 356/152 |
| 4,319,838 | 3/1982 | Grossman et al. | 356/152 |
| 4,336,658 | 6/1982 | January et al. | 33/288 |
| 4,381,548 | 4/1983 | Grossman et al. | 364/551 |
| 4,594,789 | 6/1986 | Marino et al. | 33/288 |
| 4,761,749 | 8/1988 | Titsworth et al. | 364/559 |
| 4,879,670 | 11/1989 | Colarelli | 364/559 |
| 4,931,964 | 6/1990 | Titsworth et al. | 364/559 |
| 5,018,853 | 5/1991 | Hechel et al. | 356/155 |
| 5,088,320 | 2/1992 | Fukuda et al. | 73/118 |
| 5,111,585 | 5/1992 | Kawashima et al. | 33/203 |
| 5,528,496 | 6/1996 | Brauer et al. | 364/424 |

FOREIGN PATENT DOCUMENTS

| | | |
|---|---|---|
| 2436365 | 4/1980 | France . |
| 2570178 | 4/1991 | France . |
| WO 81/00909 | 4/1981 | WIPO . |

*Primary Examiner*—Frank G. Font
*Assistant Examiner*—Michael P. Stafira
*Attorney, Agent, or Firm*—Young & Thompson

[57] ABSTRACT

The geometric inspection of wheeled vehicles is carried out by at least two casings facing each other and each comprising at least one light source and at least one optical receiver located behind a device for defining an image. The image-defining device is sensitive to radiation from the light source of the other opposite casing. The light source (12) of a first casing defines with the optical receiver (13) of a second opposite casing a first active spatial zone (A). The light source (8) of that second casing defines with the optical receiver (14) of the first casing a second active spatial zone (B). The two active spatial zones (A, B) are separated by a space (C) of predetermined width (d) to permit simultaneous operation of the two casings without mutual interference.

20 Claims, 34 Drawing Sheets

|  | | | | |
|---|---|---|---|---|
| MARQUE | TYPE | | ANNÉE 1 | 11:11 |
| | | | | 30/04/94 |

| | | | | |
|---|---|---|---|---|
| PARA TOTAL 🔧 | − 0°30' | − 0°15' | 0°00' | |
| PARA ROUE | ...... | − 0°07' | ...... | |
| CARROSSAGE | − 0°39' | 0°00' | + 0°39' | ...... |
| CHASSE | + 1°04' | + 1°39' | + 2°14' | ...... |
| PIVOT | +11°30' | +12°00' | +12°30' | ...... |
| ANGLE INCLUS | +11°30' | +12°00' | +12°30' | ...... |
| DIV. BRAQUAGE | ...... | ...... | ...... | |
| | | | | |
| PARA TOTAL | 0°00' | + 0°24' | + 0°48' | |
| PARA ROUE | ...... | + 0°12' | ...... | |
| CARROSSAGE | −1°20' | − 1°00' | − 0°40' | ...... |

| F1 | F2 | F3 | F4 |
|---|---|---|---|

FIG. 10 C

DEVICE AND PROCESS FOR THE GEOMETRIC INSPECTION OF WHEELED VEHICLES

The invention relates to an apparatus for the geometric inspection of wheeled vehicles, as well as to a process for the use of such a device.

There are known conventional devices in the prior art, particularly devices sold by the French company MULLER BEM under the name SELECTRONIC (trademark), in which the electrical signals, representative of a first angular position data relative to a wheel with respect to a single path of movement, are produced by passive electrical components (of the differential transformer or potentiometer type) secured to the wheels. These electrical signals representative of first angular data are then fed to an analogic or numeric computer to determine, by means of geometrical equations of a type known per se, the values as to parallelism of each vehicle wheel with respect to a selected axis, generally the geometric axis of the direction of thrust of the vehicle defined as the bisector of the rear wheels or the axis of symmetry of the vehicle defined as a straight line passing through the middle of the forward axle and the middle of the rear axle. As an example, FR 2.436.365 discloses such an electromagnetic device.

There are also known devices for the geometric inspection of vehicles defined by U.S. Pat. No. 4,126,943 in which the actuator arms of the passive electrical components are replaced by rotatable base plates coacting with said passive electrical components, light projectors of focussed beams being mounted on these base plates.

Finally there are known from U.S. Pat. No. 5,018,853 geometric inspection systems of vehicles comprising at least two casings opposite each other and each comprising a source of luminous emission and at least one optical receiver located behind an image definition means of the slot or lens type and sensitive to radiation from the light source of the other opposite casing. However, these known devices have the drawback that the beam from a first casing directed toward the optical receiver of a second casing is likely to cross the beam of the second casing directed toward the optical receiver of the first casing. This interference of two light beams requires alternate operation of the emission from each casing while the opposite casing remains non-emissive, this characteristic limiting for a given speed of data processing the number of measurements that can be effected in a given time.

The known devices also have the drawback that the operator is obliged to perform numerous successive manipulations as to a predetermined operative mode, which constitutes a limitation of the productivity and the efficacy of the use of the geometric inspection of vehicles.

The invention has for its object to overcome the drawbacks of the prior art, by providing a new apparatus and a process for geometric inspection of wheeled vehicles, in which the operation of two opposite casings can be simultaneous and in which the operator is continuously guided by the geometric inspection device, and the process of geometric inspection is entirely automated, except the operations of mechanical securement or mechanical adjustment which are effected by programs displayed by communication means forming a part of the device.

The invention has for its object an apparatus for geometric inspection of wheeled vehicles, of the type comprising at least two casings opposite from each other, each comprising at least one source of light emission and at least one optical receiver located behind an image definition means of the slot or lens type and sensitive to radiation from the light source of the other opposite casing, characterized in that: the light source of a first casing defines with the optical receiver of the second opposite casing a first active spatial zone, the source of light emission of the second casing defines with the optical receiver of said first casing a second active spatial zone and the two said active spatial zones are separated by a space of predetermined width to permit simultaneous operation of the two casings without mutual interference.

According to other characteristics of the invention:

within each casing, a light source and an optical receiver are mounted on a common body shaped to define a light emission window and to define a chamber provided with an image definition mask, the light emission source is a portion of a light emission block comprising an electronic supply and control circuit, the optical receiver being a portion of an optical reception block comprising an electronic circuit for processing the signal controlled by the light reception, the apparatus comprises a central unit connected by communication means to casings or measurement arms each comprising a control panel permitting the control of the central unit from the corresponding casing or arm, at least one casing or at least one arm is connected to and communicates with a wheel pivoting plate supplying an electrical output signal representative of the angular position of a vehicle wheel, at least one pivoting plate comprises a pair of drive rollers for a vehicle wheel, adapted to drive said wheel in rotation so as automatically to effect the wheel alignment during operation of the device, the apparatus comprises two measurement casings fixed to the forward wheels of the vehicle and two measurement arms fixed to the rear wheels of the vehicle, the apparatus comprises four measurement arms each fixed to one wheel of the vehicle, control means of the device are disposed on the one hand on the central unit and on the other hand on each measurement means fixed to the wheels of the vehicle and the control means secured to the wheels of the vehicle comprise a wheel alignment control, the apparatus is programmable and contains an internal program configured in a tree pattern for particularly the automatic execution of physical measurements, the production of interactive operative instructions and the automatic standardization of the measuring apparatus, on a display screen, the display is controlled by said internal program, so as to operate in a closed loop by emission in real time of operative instructions for geometric inspection and by reception and display in real time of the physical measurements and the values calculated from the measurement arms or casings, so as to indicate the instantaneous condition of the inspected vehicle and of the device in response to the operations executed following the prescription of the operative instructions, information communication means are controlled by said internal program, so as to operate in a closed loop by emission in real time of operative instructions for geometric inspection and by reception and communication in real time of physical measurements and values calculated from the measuring arms or casings, so as to communicate the instantaneous condition of the inspected vehicle and of the apparatus in response to operations executed by following the program of the operative indications, said communication means comprise sound transmission means, said communication means comprise an interactive voice control, the apparatus comprises four measuring arms of which each is secured to one wheel of the vehicle, and of which at least one arm comprises a camera block provided with a multidirectional optical receiver and with a multi-directional light source or several unidirectional light sources, two measuring arms are disposed toward the exterior of the vehicle, two measuring arms are disposed toward the interior of the vehicle, four measuring arms are disposed toward the interior of the vehicle, the apparatus measures moreover the values of geometrical angles or distances along at least one diagonal or quadrilateral defined by the camera blocks, the vehicle is disposed on an elevating bridge comprising wheel support plates raised for the passage of the paths of action of the camera blocks beneath the vehicle or alternatively for the passage of the camera blocks themselves, at least one measuring arm is separable from the casing fixed to the wheel to be secured anew to another casing of a wheel or to the other side of the same casing, so as to position a measuring arm as desired externally or internally of the vehicle as a function of the overall size of the vehicle, at least one casing comprises several slotted masks or lenses for the definition of an image on an optical receiver, particularly a CCD detector, the apparatus comprises remote or telecontrol means for remote loading of data from a data bank, the apparatus comprises telediagnostic or telemaintenance means, for the gathering of data on the condition of the device by telecommunications techniques or for supplying repair instructions.

The invention also has for its object a process for geometric inspection of wheeled vehicles, comprising the following steps:

a) gathering information as to the identification of the vehicle and/or the client, b) actuating a database containing technical characteristics of vehicles and validating the data corresponding to the vehicle to be inspected, c) effecting a visual inspection, d) emplacing and securing fixedly to the wheels of the vehicle measuring casings or arms, e) effecting a geometric balance comprising a computer assisted wheel alignment, a computer assisted vehicle position correction, a computer assisted centering of direction and a direct or computer assisted leveling of the axle so as automatically to determine the geometric balance of the vehicle.

According to other characteristics of the invention:

the wheel alignment is effected automatically by control of drive rollers for rotation of the vehicle wheel, the vehicle position correction is effected automatically by tractive and holding members acting on the body of the vehicle, the steering angle of the steering wheel is controlled by computer according to an angular variation of the steering predetermined in a given direction and in the direction opposite to said given direction, the steering angle of the steering wheel is controlled according to a predetermined angular speed of variation of steering angle in the vicinity of the ends of the total range of steering, a geometric balance is automatically communicated to the operator by technical communication means upon the achievement of step e).

Another modification of the process according to the invention comprises the following steps:

f) effecting a computer assisted wheel alignment and a computer assisted correction of vehicle position, g) adjusting the physical and geometric characteristics of the vehicle while being assisted by instructions communicated by a computer which communicates simultaneously data representative of the variations of said physical and geometric characteristics in real time during said adjustment.

According to other characteristics of this modification of the invention:

there is adjusted particularly the setback of the wheels of the forward axle ("forward setback") or the setback of the wheels of the rear axle ("rear setback"), there is effected the steps of computer assisted calibration of the zeros of the detectors and of computer assisted variation of the gains of the detectors, and the computer assisted steps of calibration of the geometric characteristics of the raising bridge or work post supporting the vehicle.

According to still another modification of the invention, there is carried out, with the aid of an apparatus comprising at least one block camera having several masks or several slots or several image definition means, the steps of measuring and dimensionally inspecting the vehicle, in particular for the dimensional inspection of the body of the vehicle.

According to other characteristics of this other variation of the invention:

at least three camera blocks are mounted on a predetermined reference base, at least one camera block comprising a mask having two slots defining a cross, is used so as to measure the angles and distances from the horizontal and the vertical, the environment of the vehicle is calibrated, to select a reference base or alternatively to verify the geometry of a predetermined reference base, a light emitter is fixedly secured in known relation relative to a reference point to be inspected, a retro-reflector of polyhedral form is secured in fixed known relation relative to a reference point to be inspected.

The invention will be better understood from the description which follows given by way of non-limiting example with reference to the accompanying drawings, in which.

Figure 1:
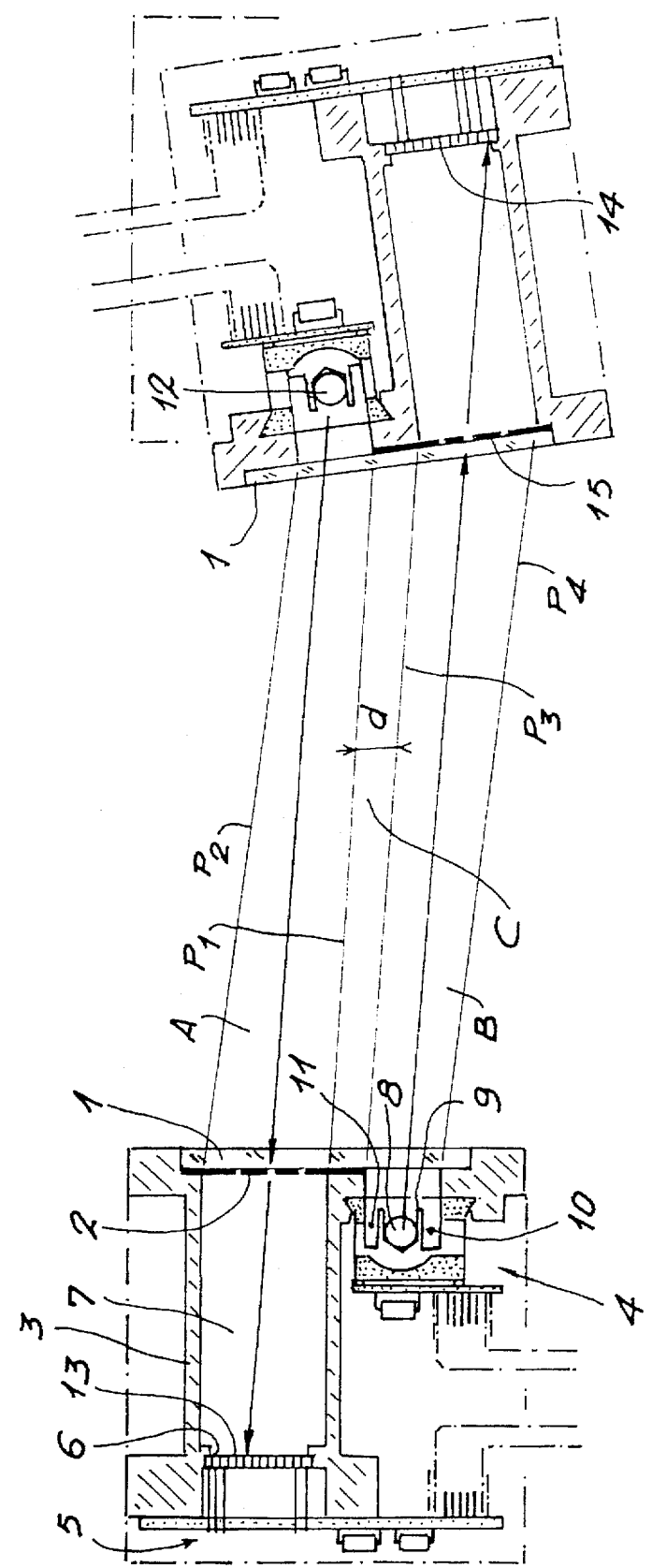
FIG. 1 shows schematically a cross sectional view of the apparatus according to the invention.

Referring to FIG. 1, a device for the geometric inspection of wheeled vehicles comprises at least two casings opposite to each other, casings of the general type described in French patent application 93.12059 of Oct. 11, 1993 and French patent application 93.12526 of Oct. 20, 1993 in the name of the assignee.

As to parallelism, the important measurement apparatus is the camera blocks whose principle has been described in French patent application 93.12059 mentioned above and whose mounting has been described in French patent application 93.12526 mentioned above. In this embodiment of the present invention, two camera blocks of which each is secured to a casing of an apparatus according to the invention, are disposed opposite each other so as to cause the optical emitter of a first casing to coact with the optical receiver of the second casing, and vice versa.

Relative to the prior art, the camera blocks which are optical measurement apparatus without contact and without mechanical movement avoid the use of apparatus of the prior art comprising passive electrical components with an actuation arm or a rotatable base plate. The precision of measurement is greatly improved: it is of the order of 1 minute of arc over the central measurement range, whose amplitude is of the order of + or −5° of sexagesimal angle.

The advantages of the multiple slot system have been amply described in French patent application 93.12059, to which reference should be had to note that the system of camera blocks has an important range of measurement permitting the steering of the vehicle wheels in the course of measurement.

A first camera block is formed by an assembly of a window 1 of synthetic material tinted infrared and whose two principal surfaces are polished and perfectly flat, a mask 2 comprising three parallel slots spaced from each other by about 4 mm, a principal body 3 supporting both an optical emission assembly 4 and an optical reception assembly 5. The principal body 3 is shaped as a chamber limited at one end by the mask 2 comprising at least one slot and at the other end by a circuit board bearing an optical detector of the CCD type, said circuit board ensuring simultaneously the function of mechanical closure and the optical CCD detector being exactly inserted into a groove 6 of the principal body 3 so as to effect sealing from dust and a practically perfect closure of the chamber 7 defined within the body 3.

The optical emission assembly 4 comprises a flash lamp 8 disposed at the end of a bracket 9 constituted in a block bearing a circuit board for the supply and control of light emission and delimited by two recesses 10 and 11, so as to ensure good cooling on opposite sides of bracket 9 and of the flash lamp 8 of an instantaneous power of 1000 watts. This general mechanical arrangement permits rapid replacement of the light emission block 4 or of the light reception block 5. Electronic circuits for the control and inspection of individual light emission supply and reception are of known type or equivalent to those of suppliers of optical detectors or optical emission lamps and will not be further described.

According to the invention, a light emission source 12 defines with the optical receiver 13 disposed opposite the light emission source 12 but of the other casing disposed opposite the first casing carrying the light emission source 12, a first active spatial zone A delimited by two planes P1 and P2 joining the respective edges of the light emission slot of the source 12 and of the respective edges of the mask located in front of the CCD detector 13. A second light source 8 belonging to the second casing (bearing the CCD detector 13 mentioned above) defines with the CCD detector 14 of the first casing a second active spatial zone B delimited by two planes P3 and P4. The planes P3 and P4 also pass through the respective edges of the slot of the light source 8 and the edges of the mask 15 disposed upstream of the CCD detector 14 of said first casing. The planes P1 and P3 define a space C of predetermined width d sufficient to avoid any interference between the emission of an optical emitter of a first casing and the emission of an optical emitter of a second casing. Thus, thanks to the invention, the light emissions of the two casings can be actuated simultaneously, which avoids any interference and permits obtaining a maximum number of measurements limited only by the data processing capacity of the device according to the invention.

Figure 2:
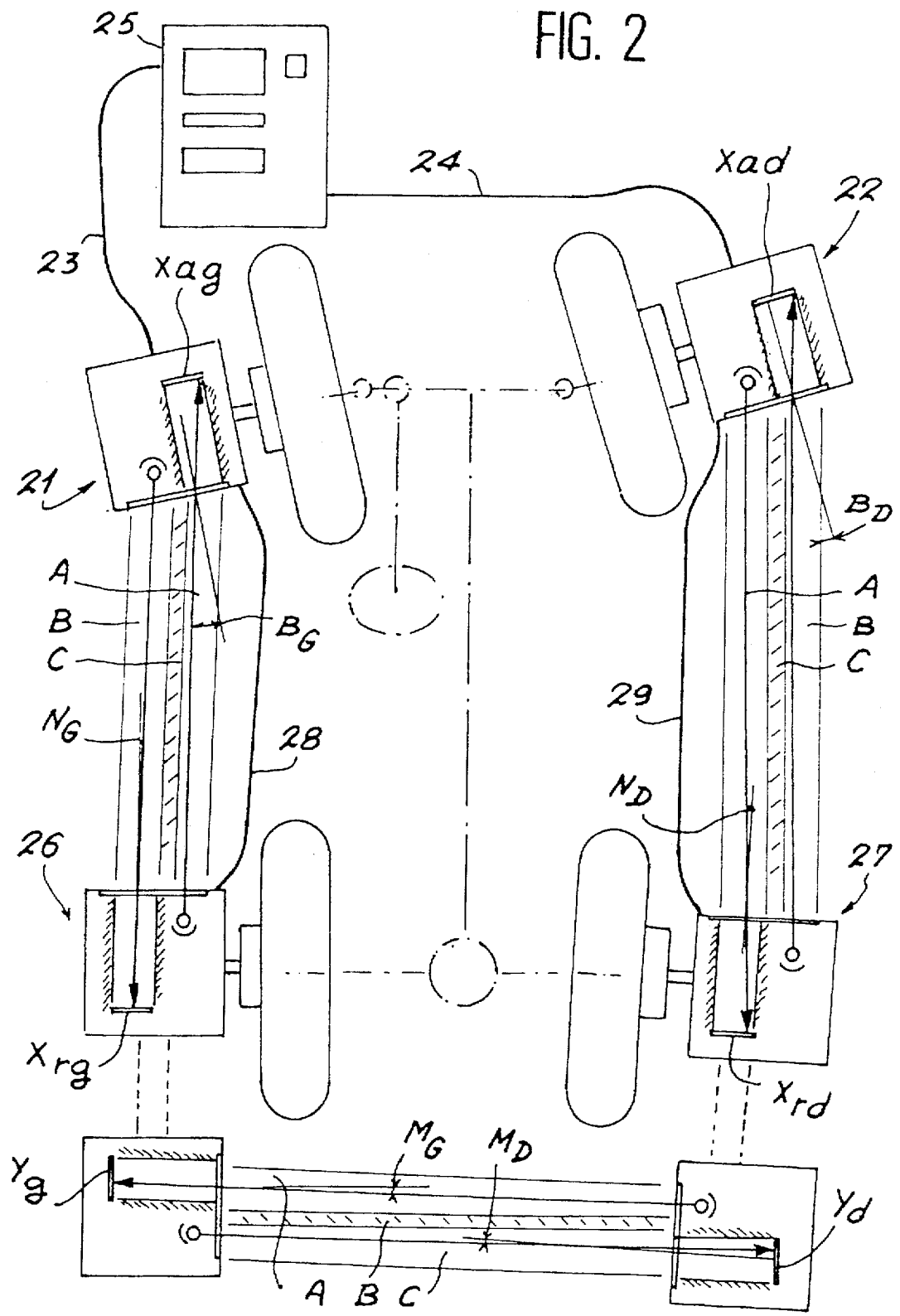
FIG. 2 shows schematically a view from above, with the casings partially cut away, of a first embodiment of an apparatus according to the invention in position mounted on the wheels of a vehicle.

Referring to FIG. 2, an apparatus according to the invention comprises a mounting for six camera blocks contained in casings secured by hooks to the wheel rims of the vehicle according to an arrangement as in French patent application 93.12617 of Oct. 22, 1993 should be had for a more detailed explanation.

The casings 21 and 22 are connected by communicating connectors 23 and 24 to a central mobile unit 25 comprising a program for inspection and control adapted to guide the operator according to a geometric inspection process which will be described hereinafter.

The measurement casings 21 and 22 are connected to the measuring arms 26 and 27 secured to the rear wheels of the vehicle and each comprising two camera blocks, by means of communication connections 28 and 29. The communication connections 23, 24, 28 and 29 are wire connections permitting the passage of analogic or numeric electric signals and the dialogue of each independent measuring casing or arm with the central mobile unit 25.

Of course, the invention also covers the modification in which the connections 23, 24, 28 and 29 are so-called "wireless" communication connections, which is to say of the Hertzian type, of the infrared radiation transmission type, or any other long distance data transmission means.

Each optical emitter of a casing emits in the direction of the optical receiver of another opposite casing according to the mechanical mounting structure explained in detail in previous FIG. 1, thereby providing, at the level of each zone situated between opposite housings, for the separation of the active spatial zones A and B via space C of a predetermined width, selected preferably to be greater than 4 mm.

Of course, the invention also covers the case of a space C of a width less than 4 mm, in the case in which the opposite casings are relatively close to each other.

Knowing the deflection distances $X_{ag}$, $X_{ad}$, $X_{rg}$, $X_{rd}$, $Y_g$ and $Y_d$ there is determined by trigonometric calculation the angles constituting a first angular information $B_G$, $B_D$, $N_G$, $N_D$, $M_G$, $M_D$ analogous to those described with respect to the French application 93.12617 mentioned above, by means of the following formulae:

$$B_G = \text{Arctg}\, \frac{X_{ag}}{f}$$

$$B_D = \text{Arctg}\, \frac{X_{ad}}{f}$$

$$N_G = \text{Arctg}\, \frac{X_{rq}}{f}$$

$$N_D = \text{Arctg}\, \frac{X_{rd}}{f}$$

$$M_G = \text{Arctg}\, \frac{Y_q}{f}$$

$$M_D = \text{Arctg}\, \frac{Y_d}{f}$$

in which f is the focal distance between the active slot of the slotted mask and of the camera and the cell or pixel constituting the reference 0 of the CCD detector and corresponding to a normal radiation incidence in the plane of the active slot of the mask with corresponding slot.

Figure 3:
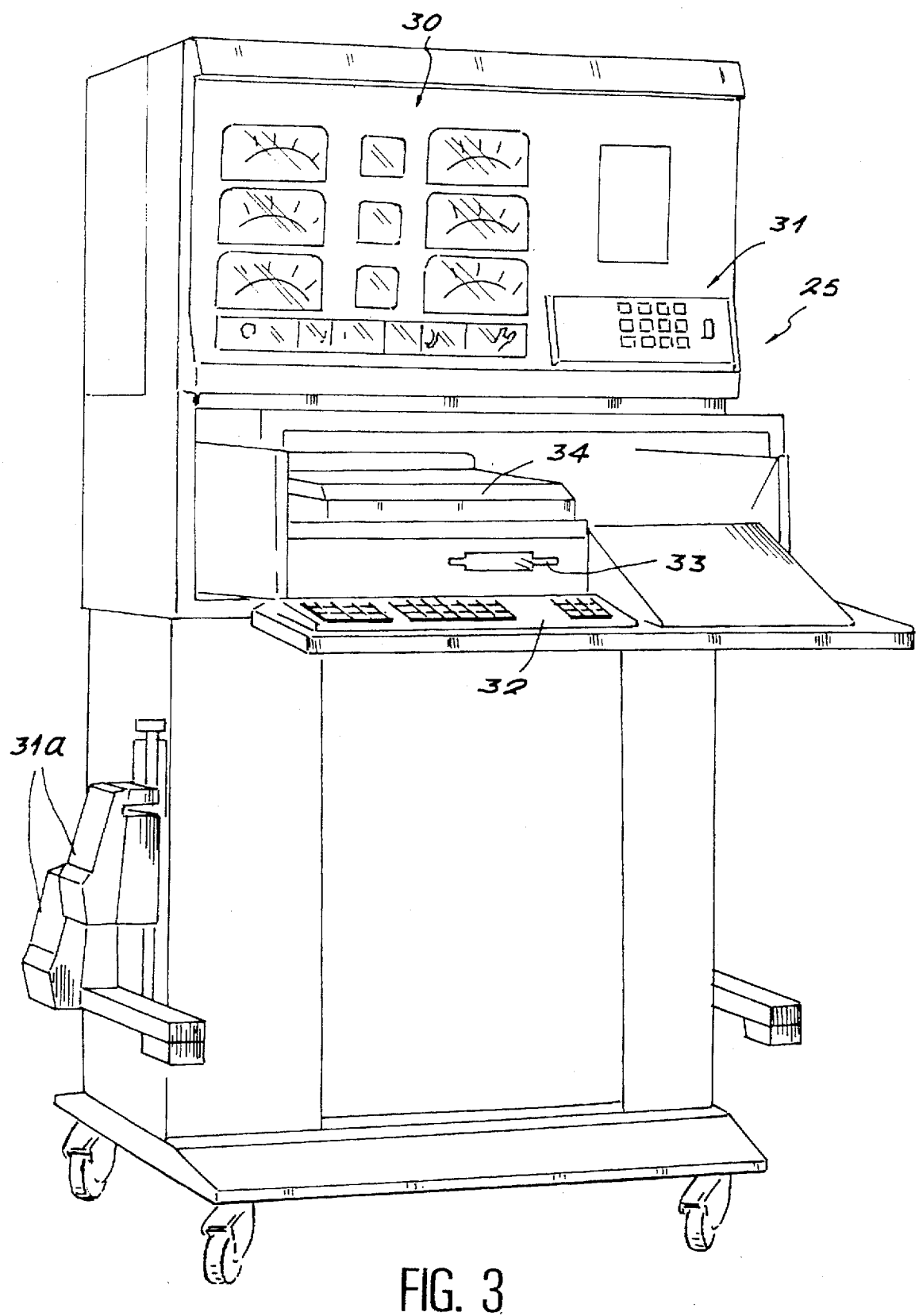
FIG. 3 represents schematically in perspective an overall view of an apparatus according to the invention in unmounted position.

Referring to FIG. 3, an apparatus according to the invention is shown in this mounted position: the mobile central unit 25 comprises a color video screen 30 of the SVGA type mounted on a common support also carrying a keyboard 31 permitting direct access to the programmed functions and usable in normal service by the operator of the geometric inspection; a keyboard 30 to 102 permitting dialogue with a central unit of the PC 386 type contained in the common support, and a reader 33 of 3½" diskettes. Of course, the invention is also applicable to any central unit comprising a memorization means or data processing means available as of the filing date of the present application: by way of non-exhaustive examples, could be cited magnetic bubble memories, flash memories, numerical storage disks known as CD ROM, integrated identification detectors of the circuit card type, bar codes, or other markings adapted to be read by means of a detector or an optical stylograph.

The information outlet means comprise a printer of a type known per se; but of course, the invention covers also any other information communication means on a legible support, or magnetic support (magnetic card), on an electronic support (circuit card) or on a visual display support or vocal announcement.

The mobile central unit of FIG. 3 can also comprise a multi-station user system with infrared telecommand permitting effecting all the operations remotely and commercialized for several years by the French company MULLER BEM under the mark BILANMATIC.

The common support is a framework provided with rollers also carrying measuring heads which each comprise a control keyboard 31a equivalent to the keyboard 31 adjacent the color video screen 30.

A modification of the invention is shown as to its external appearance in the catalog edited by the French company MULLER BEM under the name MULLER Catalog 46 which is available to the public as of the filing date of the present application.

Figure 4:
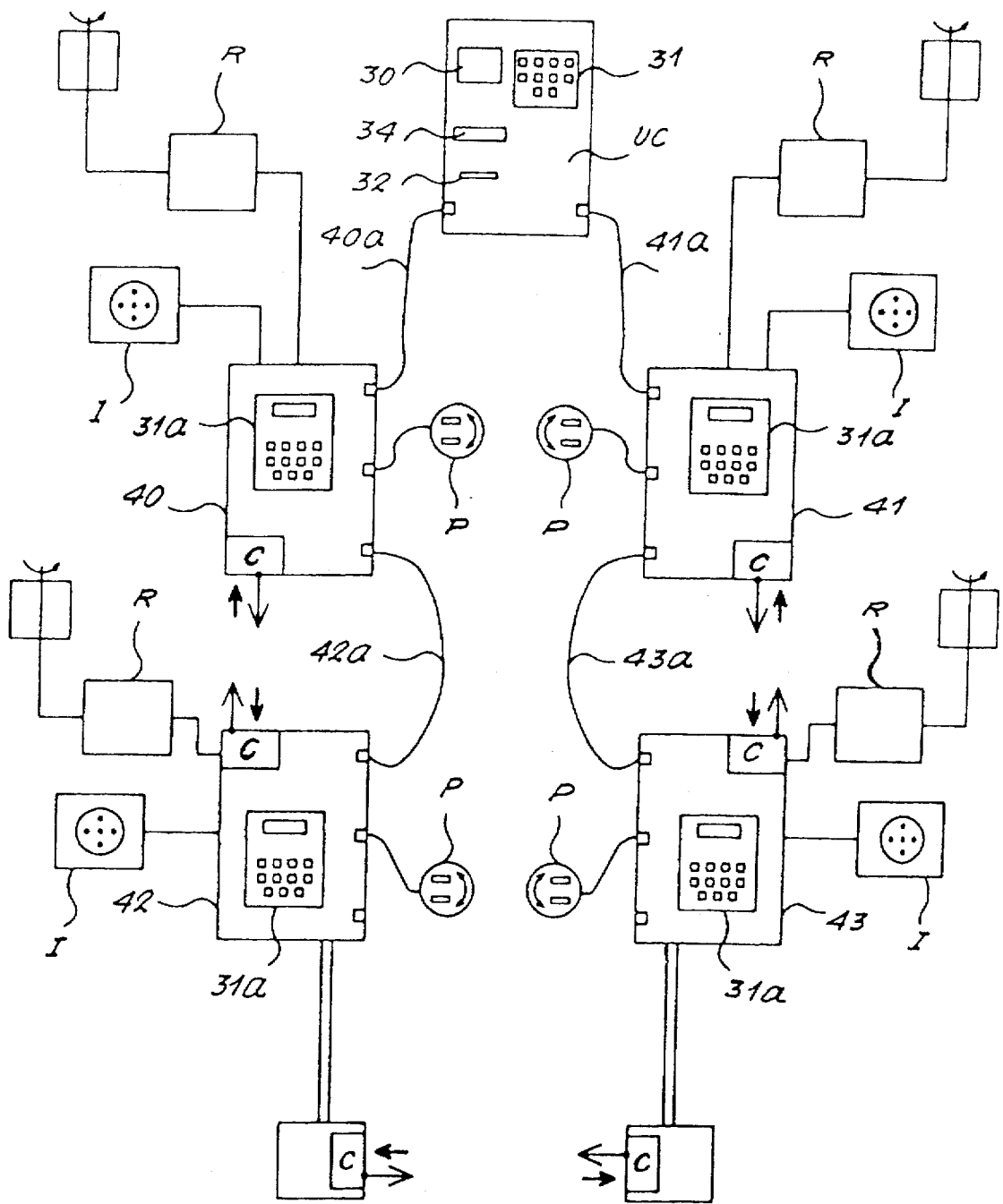
FIG. 4 shows schematically an operational diagram of the apparatus according to the invention.

Referring to FIG. 4, a device according to the invention is shown in its data acquisition state. To this end, the central unit CU is connected to two casings or two measuring arms 40 and 41 by wire connectors 40a and 41a, constituting a data transmission bus. The measuring casings 40 and 41 are connected to measuring arms 42 and 43 by other wire connectors 42a and 43a. Of course, the invention is also applicable to the case of transmissions between the central unit and the measuring head by means of wireless transmission, for example by infrared data transmission or high frequency or other systems of optical or sound transmission.

According to a first embodiment, the control action by pressing on a key of either keyboard 31 or 31a for controlling the device renders the keyboard 31 or 31a the master of the device and permits causing the device to operate under all functionalities from this keyboard 31 or 31a. According to a second embodiment, the access to the keyboard 31 or 31a is predetermined, such that a priority of operation is acquired by certain keyboards 31 or 31a relative to other keyboards 31 or 31a.

According to a third embodiment, the keyboard 31 or 31a is activated by insertion of an identity card, of the magnetic card type, magnetic seed card, or other means constituting an access key.

Each camera block C emits in the direction of another camera block C which is opposite it and receives from this opposite camera block C emitted light in a manner analogous to that which has been described with reference to FIGS. 1 and 2.

The measurement casings 40 to 43 comprise electric connection plugs permitting the connection of the connecting wires 40a, 41a, 42a, and 43a as well as the connection to the pivoting plates P of the wheels producing an electric signal of the position of rotation of the wheel. The casings 40 to 43 each contain a reference block in the space constituted by the combination of an electronic circuit of inclinometer I bearing directly an ampoule of known type comprising five electrodes and an electric signal processing circuit R provided by a potentiometer indicating the rotation of the corresponding wheel and used in particular during wheel alignment operations.

To this end, the pivoting plates P comprise drive rollers adapted to drive the vehicle wheels in rotation during the geometric inspection of the wheels so as to ensure the automatic wheel alignment of these wheels during measurements of geometric inspection.

The invention thus provides an entirely automated system for geometric inspection, whose operation is semi-automatic because the only actions to be effected by the operator concerning the geometric inspection itself are expressly indicated each time by the display screen 30 as a function of the sequence of geometric inspection to be carried out.

The analog-numerical conversion systems and the inlet and outlet interfaces are not described further as these systems are of conventional type and are available as commercial products on the market. The memory interface system can be particularly of the programmable dead memory type and electrically erasable (EEPROM), programmable dead memory (PROM), direct access memory (RAM), microprocessor for interfacing and control of the DSP (processor for the treatment of numerical signal) permitting the remote loading of new programs or of databases from manufacturers or extracted from data banks of automotive manufacturers, telediagnosticians, the storage of mass on a large capacity support particularly of the CD ROM type, the inspection of the identity of the operator by means of identification integrated directly into the vehicle (micro chip concealed in the vehicle body) or conventional recognition means (micro chip cards, bar codes or other means). The use of these new commercial products to perform the general functions of the invention does not depart from the scope of the present invention.

As to the portions internally of the casings 40 to 43, such as potentiometer R, inclinometer I and camera block C, structural details are available from application FR 93.12526.

Figure 5:
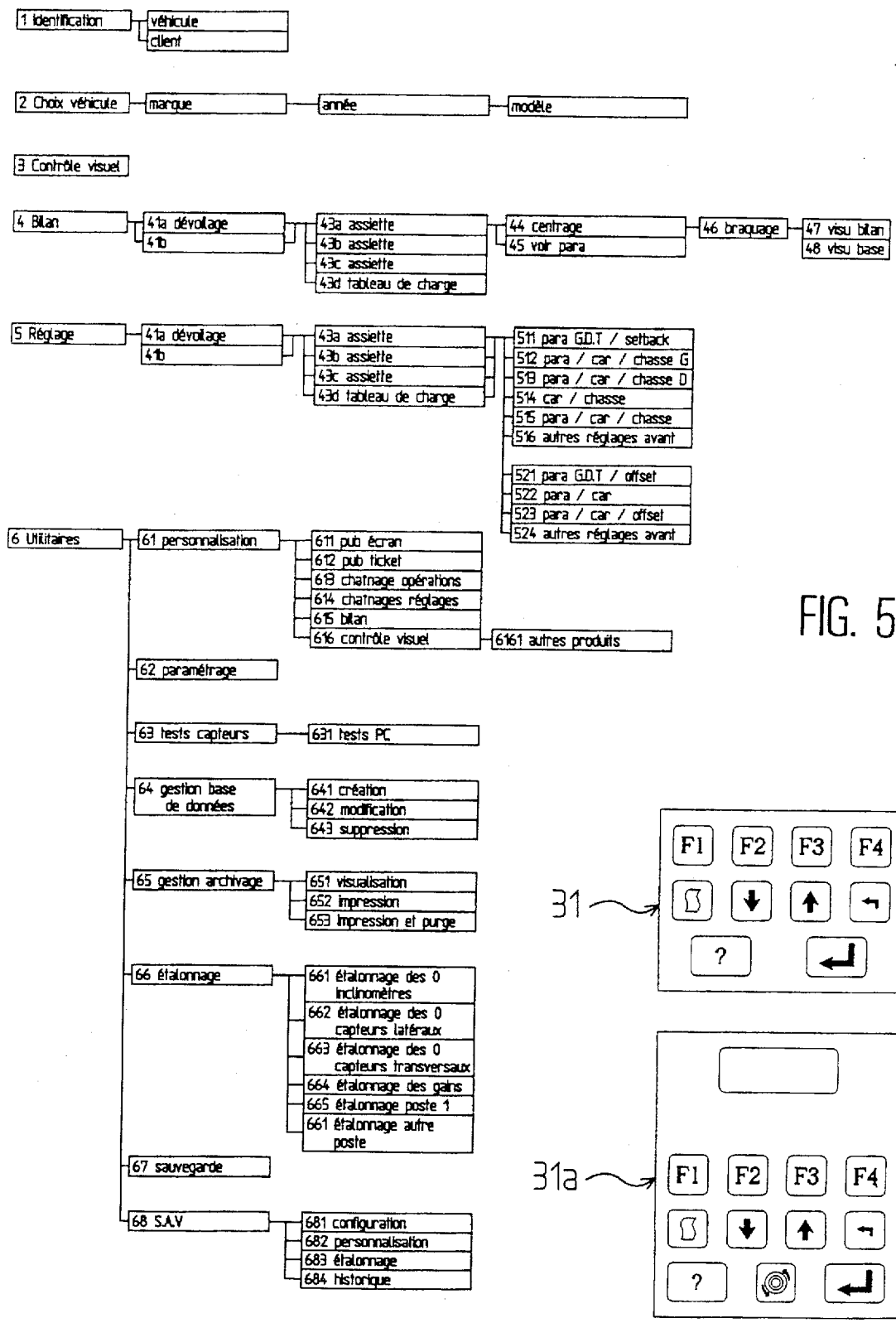
FIG. 5 shows schematically an example of a tree-pattern example of programs for using the invention.

Referring to FIG. 5, a general organizational chart of the program of operation of the central unit interacting with the measuring heads or measuring arms is shown. The invention is also applicable to any other equivalent program corresponding particularly to the installation of two measuring arms on the same axle of the vehicle, the installation of two arms on one axle and two casings on the other axle and the installation of four measuring arms on the two vehicle axles. The progress of the program and of the steps of the process for corresponding geometric inspection are carried out by pressing with the fingers of the operator on the keys of a control keyboard 31 or 31a of the recited type. The control keyboards 31a comprise an LCD display window (liquid crystal display) and ten keys whose functions have been predefined and are redefinable at any time, as well as a specific wheel alignment key.

The control keyboard 31 has no display window and comprises ten operational keys equivalent to the ten keys of the keyboards 31a.

The UTILITARIAN program comprises programs 63 for calibration and testing of the detectors of the casings as well as a calibration program 66 comprising itself a program 661 of zero calibration, a program 665 of calibration of a first station A for geometric inspection and another program 666 for calibration of another station 8 for geometric inspection. These programs permit calibrating the measurement apparatus and also measuring the effects of the geometric inspection stations relative to the horizontal, vertical plane and to a spatial localization of the bearing of the vehicle wheels during the geometric inspection (pivoting plates, clearance plates, wheel alignment rollers . . . )

The standardization of the environment of the geometric inspection device (environment comprising the elevating bridge or equivalent deck on which is positioned the vehicle and the geometrical inspection device itself) being completed, the inspection operator can, after having played on the screen the information relative to the particular geometric inspection center where the geometric inspection device is installed, proceed to the IDENTIFICATION of the vehicle with the help of an identification program in which he is guided step by step: the operator indicates for example the registration number of the vehicle, the type, the chassis number, the mileage, the number of the order of distribution, and his own technical identification. The operator proceeds simultaneously to identify the client by name, postal address and its telecommunication references (telephone, telecopy, telex, . . . ) After having effected the collection of the available data, the operator validates this collection to pass to the following step. Alternatively, according to a preferred modification of embodiment, the operator directly interrogates as to the name of the client the internal database of the device to display immediately its screen page by searching in the database that has been constructed progressively by trial.

The operator then passes to the execution of the second program titled VEHICLE CHOICE. To this end, the operator returns to the principal choice screen and selects the second program by surfing with the aid of pressure on a key comprising an arrow of the control keyboard 31, he then presses on the validation entry key, which produces the display on the screen of the list of databases of the manufacturers available in the apparatus. The key F2 permits accessing another personnel database, key F3 permits returning to the preceding screen page and key F4 permits accessing the following screen page. The validation of the automotive manufacturer causes to appear automatically the model years which are reviewed by means of the arrowed key to select the model year corresponding to the vehicle to be inspected. The choice of the model year then causes to appear the list of vehicles of the automotive brand in question corresponding to this model year. The operator then selects the vehicle in the available list in the manufacturer database and memorizes all these data while validating with the aid of the validation key.

After having effectuated the identification with the aid of the first program and the choice of the vehicle with the aid of the second program, the operator selects and validates the third VISUAL CONTROL program. This validation produces the display of successive screen pages which the operator fills while effecting the visual inspection during filling. The derived characteristics relate to the serial number, the condition of the chassis and the chassis parts, the fuel supply, the escape system, the suspension system for the axles, the steering system, the braking system, the transmission system, the light and signal system, the condition of the wheels and of the tires, the condition of the body, the condition of the equipment and various other points of the vehicle as well as pertinent additional commentary.

The following screen pages relating to the above-mentioned verifications are subdivided themselves into other screen pages: for example, to effect the visual inspection of the wheels and the tires, the validation of this choice gives rise to the appearance of a new screen page requiring the recognition of indications such as the conformity of mounting the tires, the condition of the tires, the tire pressure, the condition of the wheels, the condition of the wheel bearings. Possible defects to be recognized are precharacterized in the data base of the device, such that the operative keys predefined, appearing on the screen, permit recognizing and consecutively displaying all the characteristic defects susceptible of being visually inspected. The validation after recognition of the indications relative to the subprogram of visual inspection of the condition of the wheels and of the tires, gives rise automatically to the appearance of an empty page of COMMENTARY that the operator can fill optionally. These particular optional commentaries are preferably recognized by means of the keyboard 32 with 102 keys of FIG. 3. After having effected visual inspection and selecting the corresponding line of the page of the introductory screen shown in FIG. 6, the operator passes to the following step to execute a fourth program corresponding to the establishment of a geometric BALANCE of the vehicle. The choice of BALANCE program gives rise to the appearance of an image on the screen corresponding to FIG. 7 corresponding to the automatic or semi-automatic execution of wheel alignment. To this effect, the wheel to be aligned is indicated by a different color on the vehicle scheme located in the upper left corner of the screen. In a first modification, the operator turns the wheel by a predetermined angle, for example 180°, while maintaining the casing or the arm fixed to the wheel of the vehicle horizontal. To this end, the operator has unlocked the fastening knob of the casing or of the arm to the rim of the wheel to be aligned, to permit the wheel to turn while the casing or the arm remains substantially horizontal. According to the invention, the angle of rotation of the wheel is indicated in real time by a referenced turning image 1 on the screen of FIG. 7 and corresponds to the angle of measurement by the potentiometer of the casing or of the arm of the corresponding wheel, the degree of horizontiality is indicated by the image comprising a mobile bubble referenced 2 in FIG. 7, which produces directly on the screen the measurements effected by the inclinometer I of FIG. 4. Thus, the operator has, in real time on the screen, a step-by-step guide means indicating to him the sequence of the operations to be carried out and reproducing in real time the effective physical measurements corresponding to the position of the wheel in the course of alignment and of the casing or of the arm of this wheel. After having effected the rotation through the predetermined angle mentioned above, the rotation of the wheel is indicated on the screen and the predetermined angle is displayed as soon as the operator has turned the wheel about a corresponding angle within 5° of this angle: this arrangement is foretold in the French patent application 93.12526. This demonstrates the advantage of not having to reach a precise position to effect wheel alignment. As soon as the angle is indicated, the operator presses on the lower wheel alignment central key of the housing 31a, the screen indicates to him the acquisition of data corresponding to this value which, with the memorization of the corresponding values at the initial position, permits determining a satisfactory value of the covering curve of the wheel.

Of course, the invention also covers the case in which alignment of the wheel takes place at several points so as to increase the precision of alignment.

According to a second modification of the invention, the alignment is entirely automated. To this end, the vehicle wheel is driven by means of rollers located on the pivoting plates P described in reference to FIG. 4, so as automatically to drive the wheel and to determine continuously the characteristics of wheel alignment as a function of the rotation of the wheel. Of course, the invention also covers the case in which the wheels of the vehicle are located on the clearance plates with 2° of freedom in translation, provided with drive rollers for the wheel to be aligned. This alignment operation is effected for each vehicle wheel that the database of the manufacturer controls as to alignment.

Figure 8:
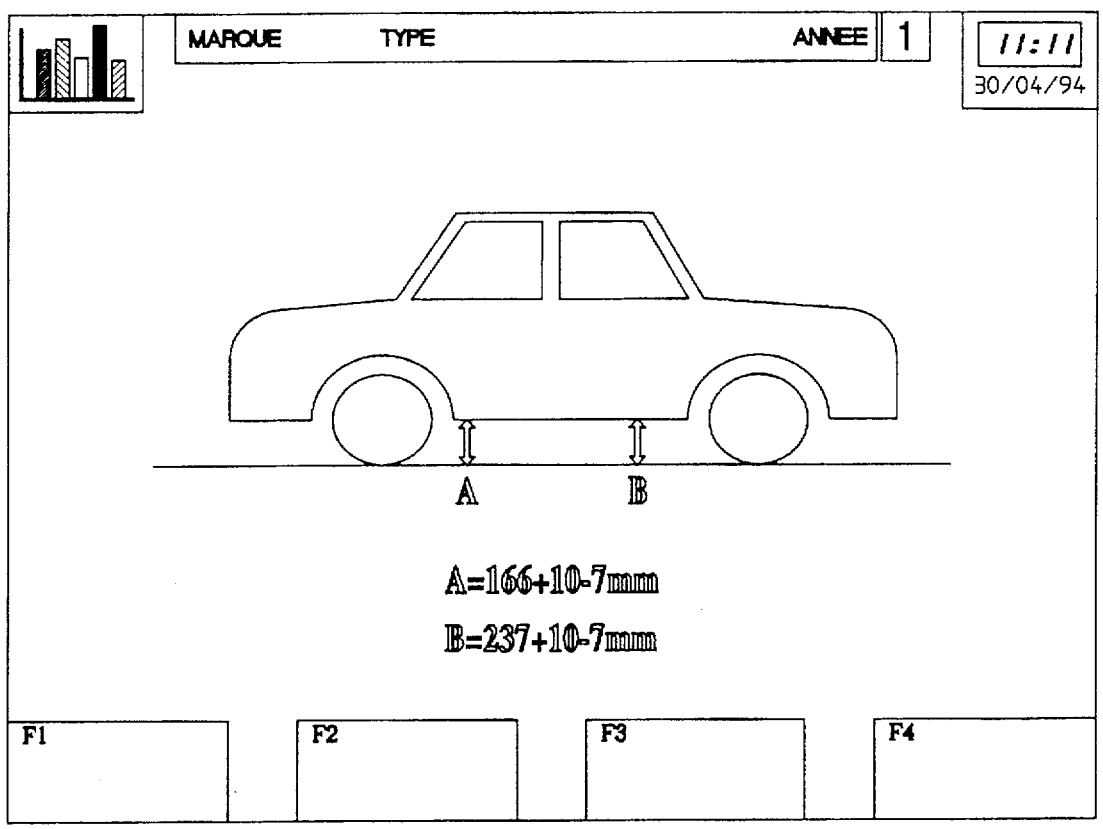
Figure 8:
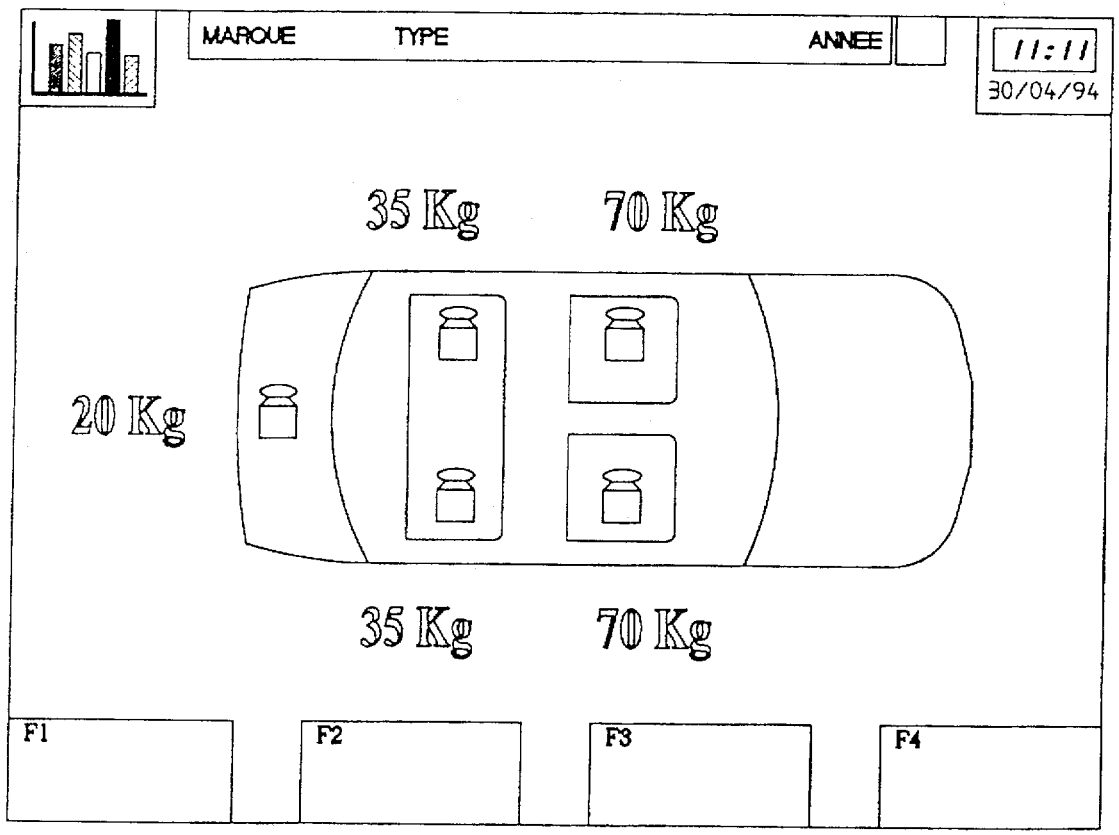
Figure 9A:
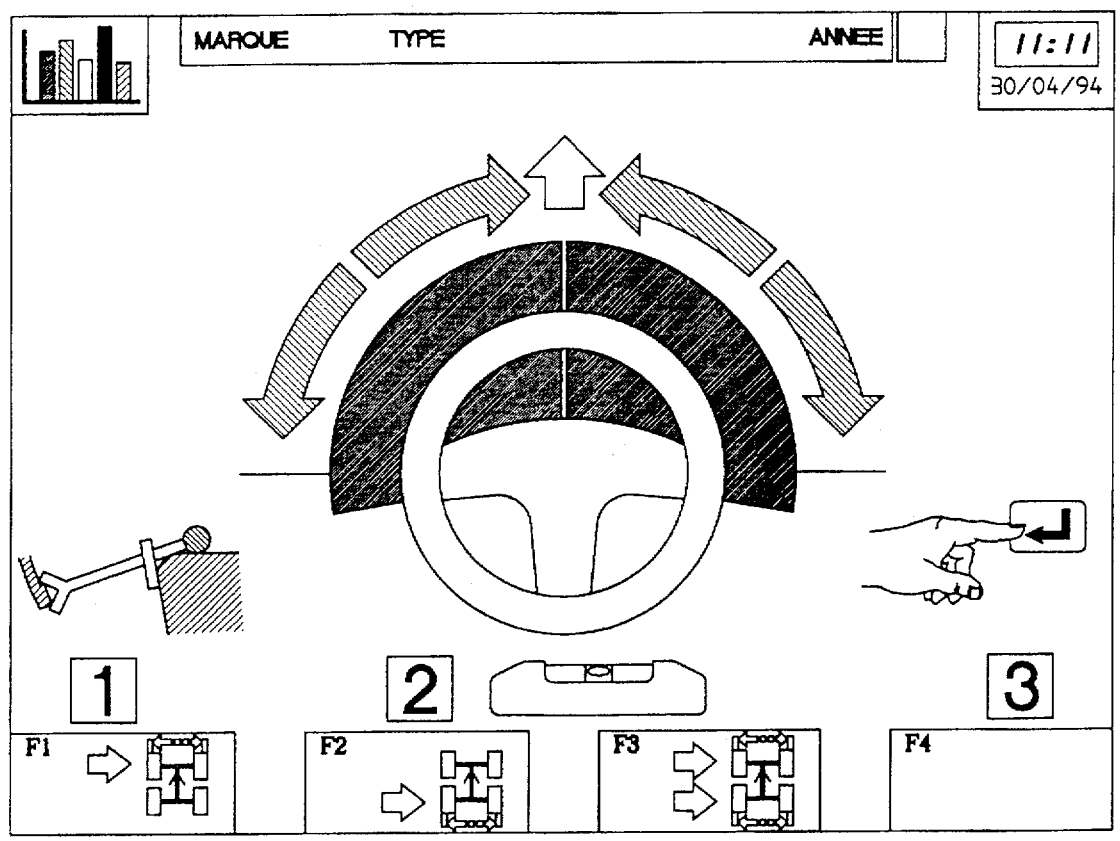
Figure 9:
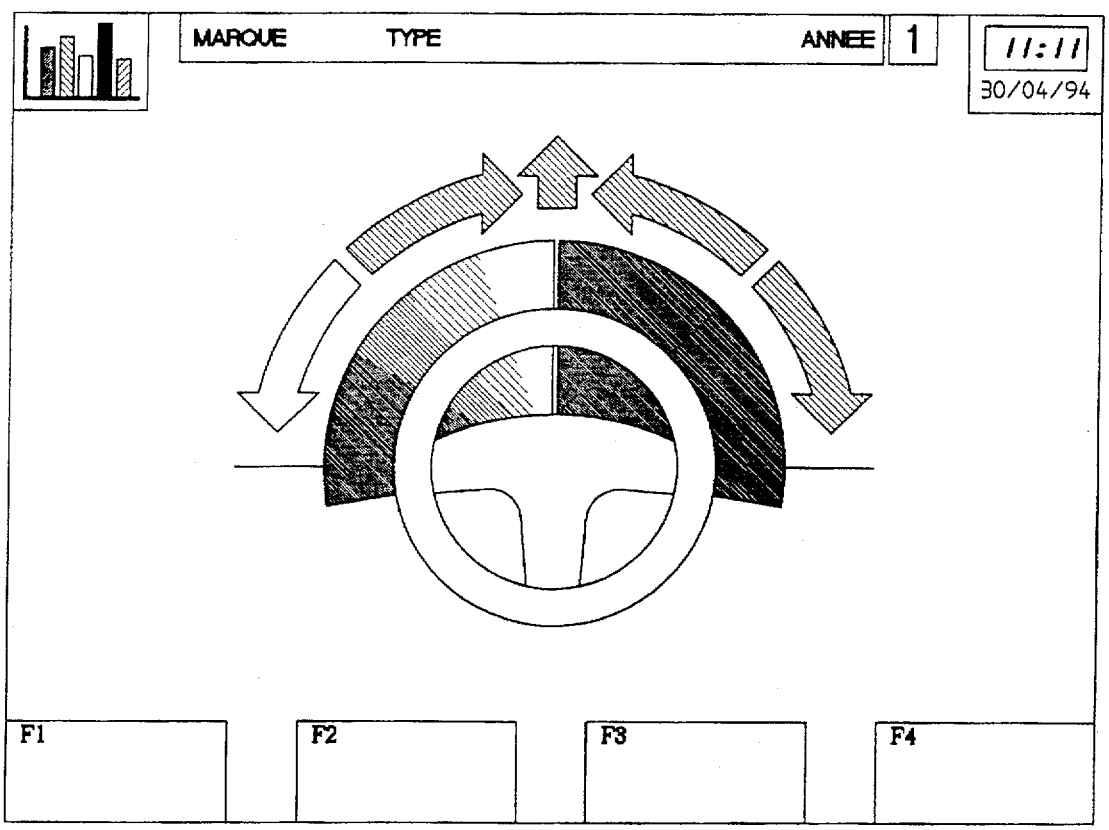
Figure 9C:
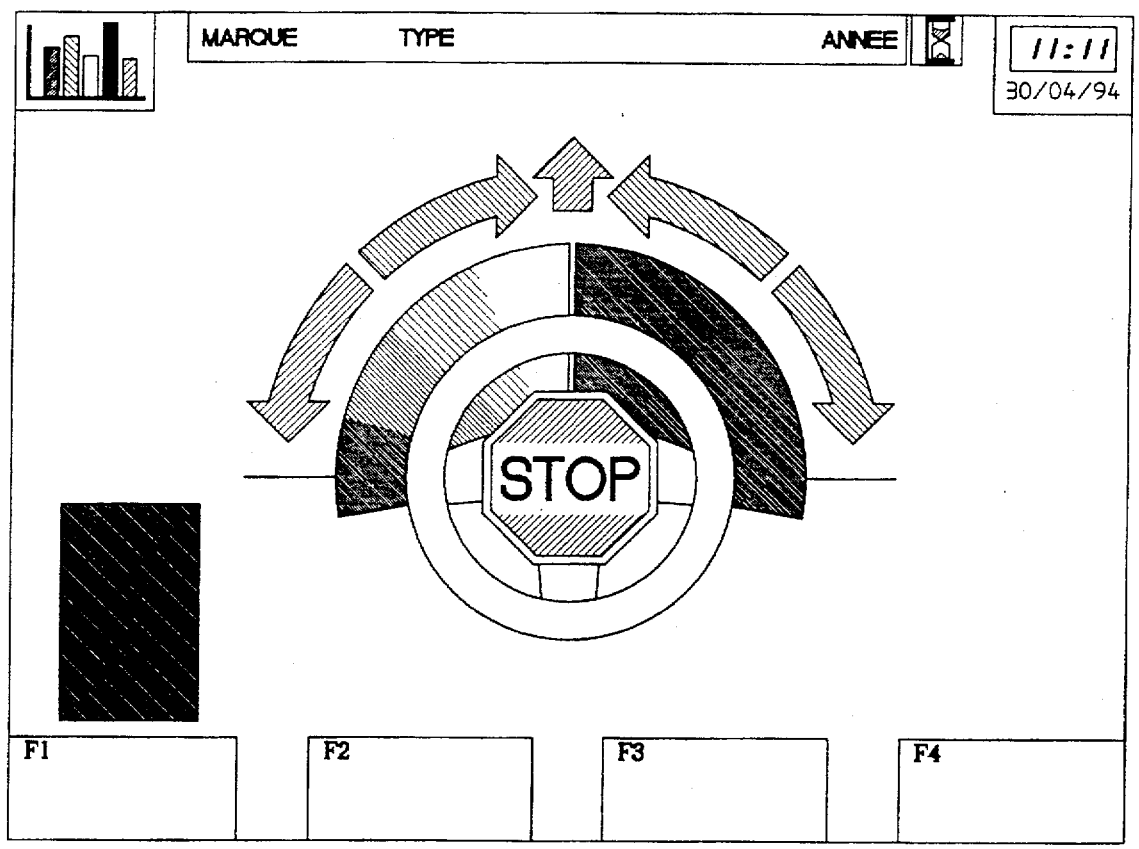
Figure 9D:
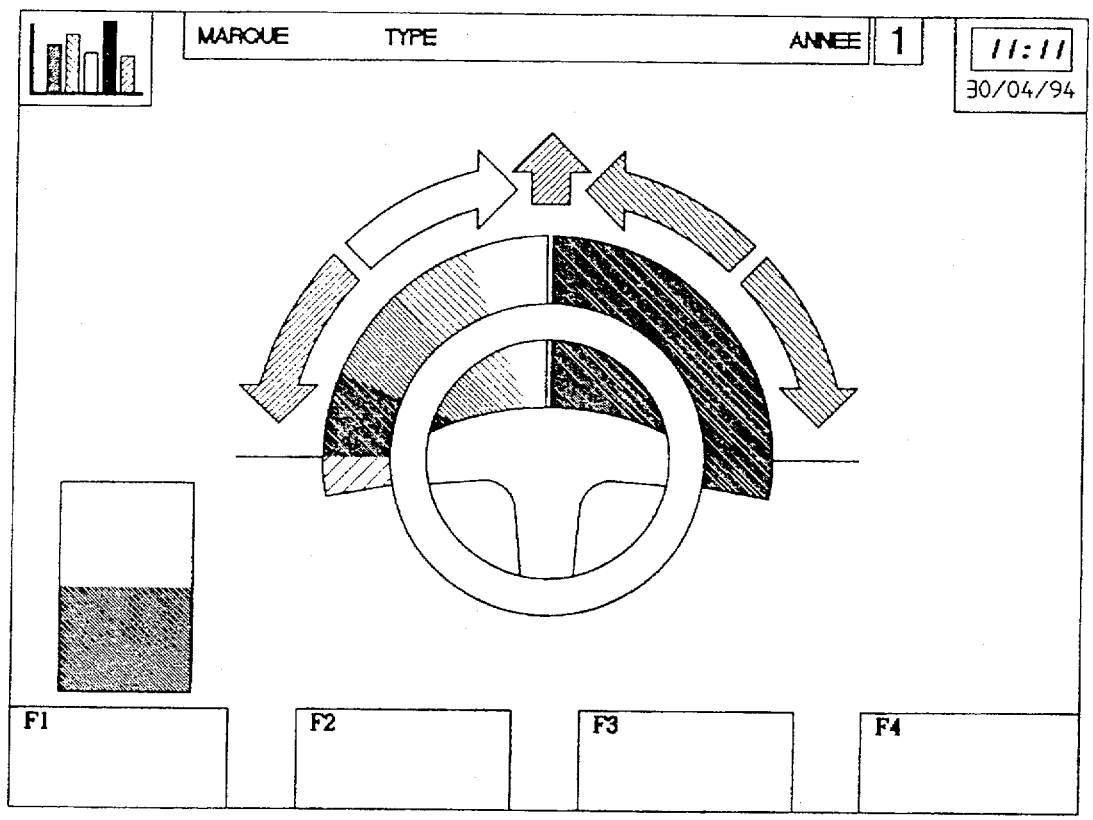
Figure 9:
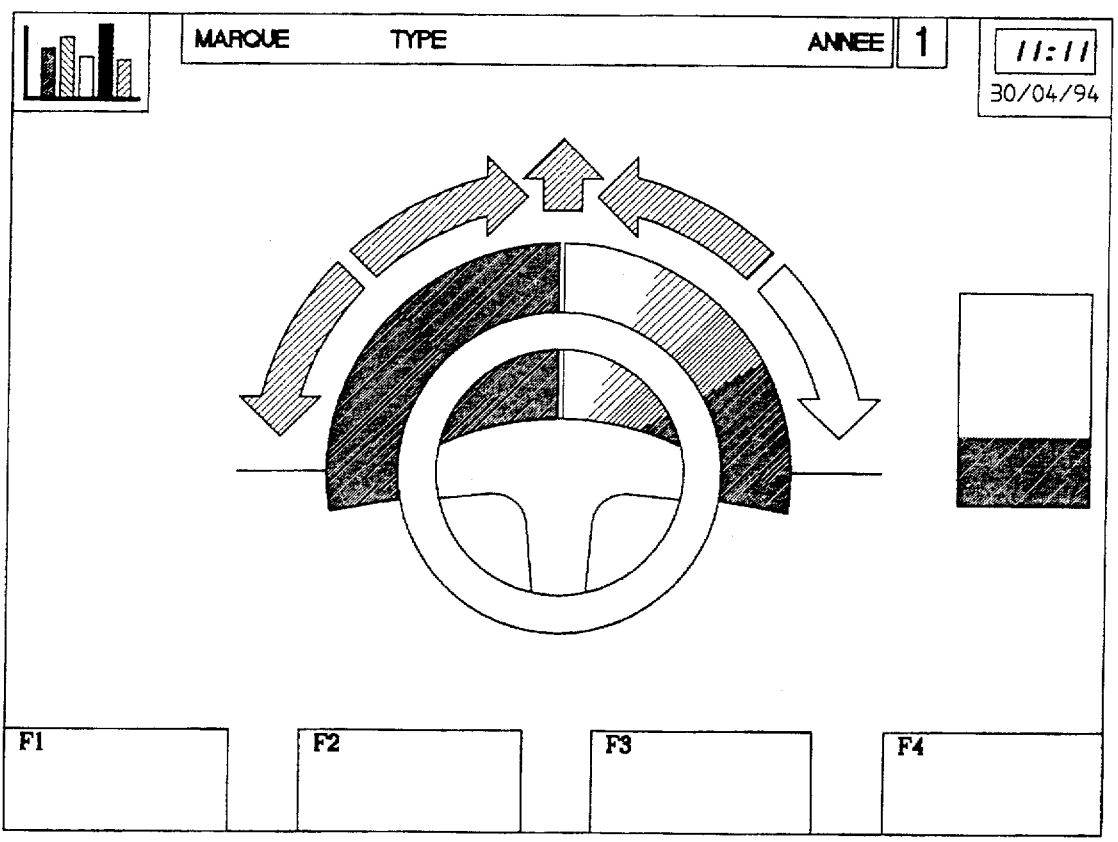
Figure 9:
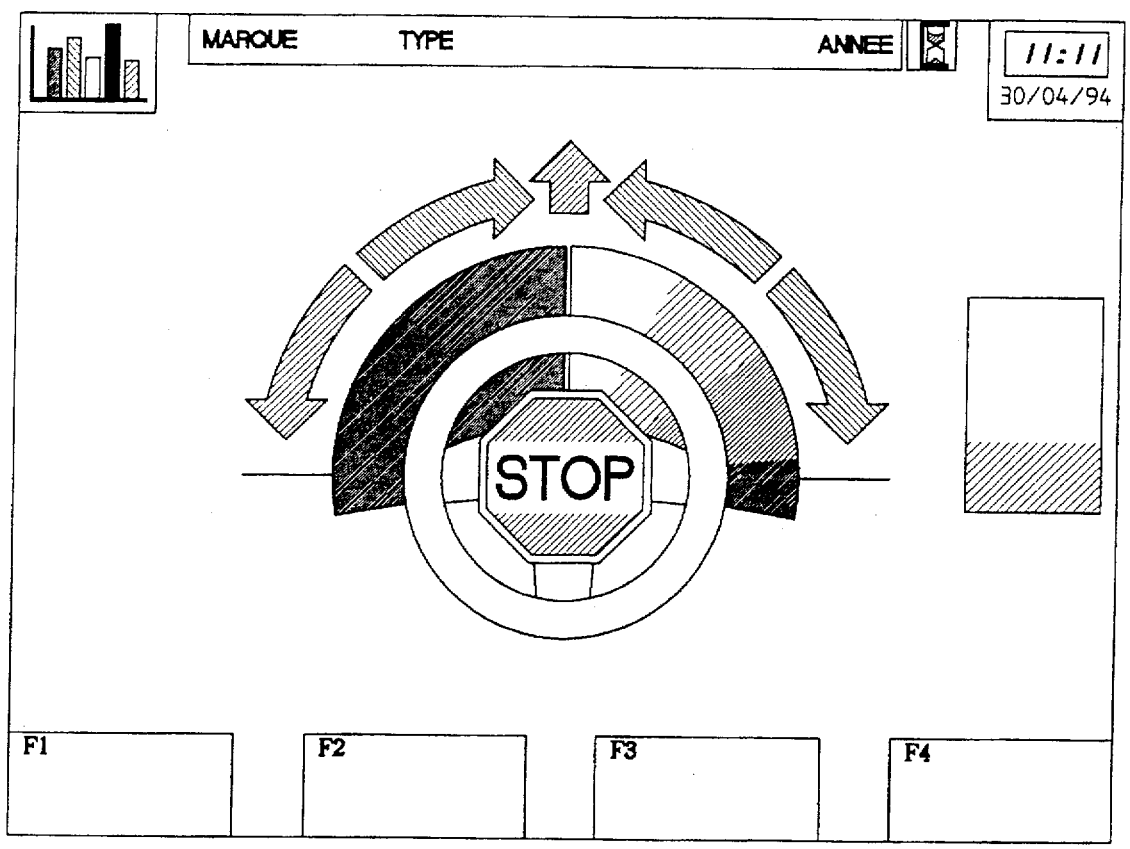
Figure 9G:
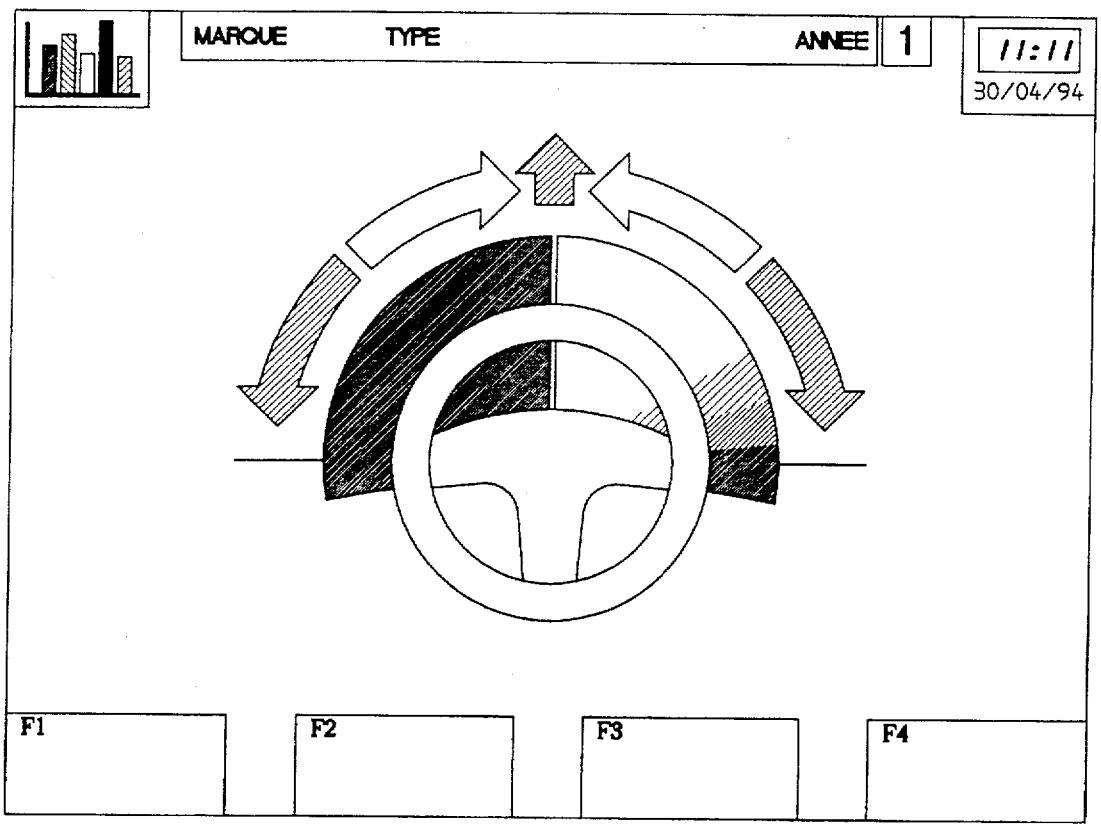

The geometric BALANCE program comprises also the determination of the vehicle position with reference to FIGS. 8A and 8B. To this end, the screen controlled by the manufacturer's database or a personal base indicates the measurements of height of the frame and indicates to the operator the load to be distributed among the various vehicle seats to obtain the heights of the chassis required by the manufacturer to effect the geometric inspection of the vehicle. To this end, the screen image is animated and continuously indicates the rise or fall of the chassis as a function of the load that the operator places within the vehicle and indicates at the same time on the screen the values in millimeters of the reference heights A and B. When the predetermined reference heights A and B corresponding to the reference vehicle position predetermined by the manufacturer are obtained in a satisfactory manner, the BALANCE program passes automatically to the following step according to the steering angle, in which a pressure pedal is first emplaced so as to apply sufficient pressure on the brake pedal of the vehicle. The measuring arms or casings are then positioned horizontally with the aid respectively of the indications supplied by the animated image 1 of FIG. 9A and the movable bubble level indicated at 2 in this figure and showing the measurement effectuated by the inclinometer I. This operation of emplacing the pressure pedal and the horizontal adjustment of the casing or arm being effected, it is possible to inspect, by means of lower icons F1, F2 or F3 showing the condition of parallelism of the vehicle, the condition of the variations of parallelism on the front wheels, on the rear wheels, on the front and rear wheels. The validation effected by the operator according to the indication of the image 3 of FIG. 9 immediately produces the appearance of the following screen which indicates to the operator in which direction to turn the steering wheel. During turning of the steering wheel (FIG. 9B) in the direction corresponding to the arrow, the steering angle is shown by a circular sector of predetermined color whose angle at the center corresponds in real time to the value of the steering angle to which the steering wheel is turned by the operator. Moreover, beyond a predetermined angle (for example 20°), the display screen gives the operator the order to slow down by indicating the supplemental angle by means of a different color: thus, the order of steering angle is given to the operator not only in terms of angular value but also in terms of angular speed in the neighborhood of the end of the steering angle. When the steering angle required by the manufacturer's data or another database is achieved, a STOP signal (FIG. 9C) appears at the center of the steering wheel and the display screen indicates to the operator to steer from the maximum steering angle, for example to the left, to an angle (FIG. 9D) of maximum steering to the right (FIG. 9E) giving him also the order to slow down the speed of steering (FIG. 9F) adjacent a predetermined angle (20°). During all these operations, the position of the steering wheel is indicated in color angularly from a zero central position. After having effected steering to the left of about 20° and then to the right by about 20° from the left steering, the operator returns the steering wheel to the center following an indication from the display screen (FIG. 9G).

Figure 10:
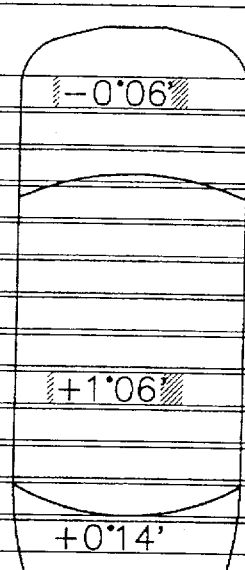
Figure 10:
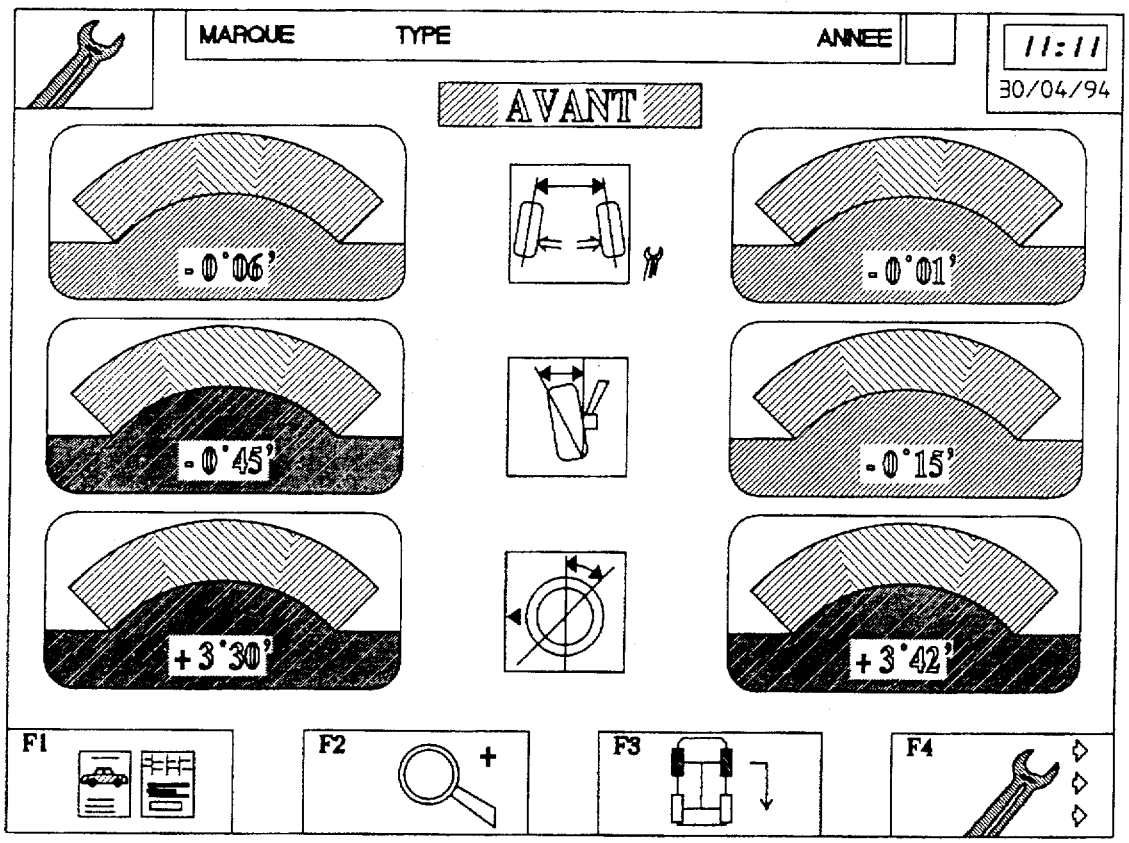
Figure 10:
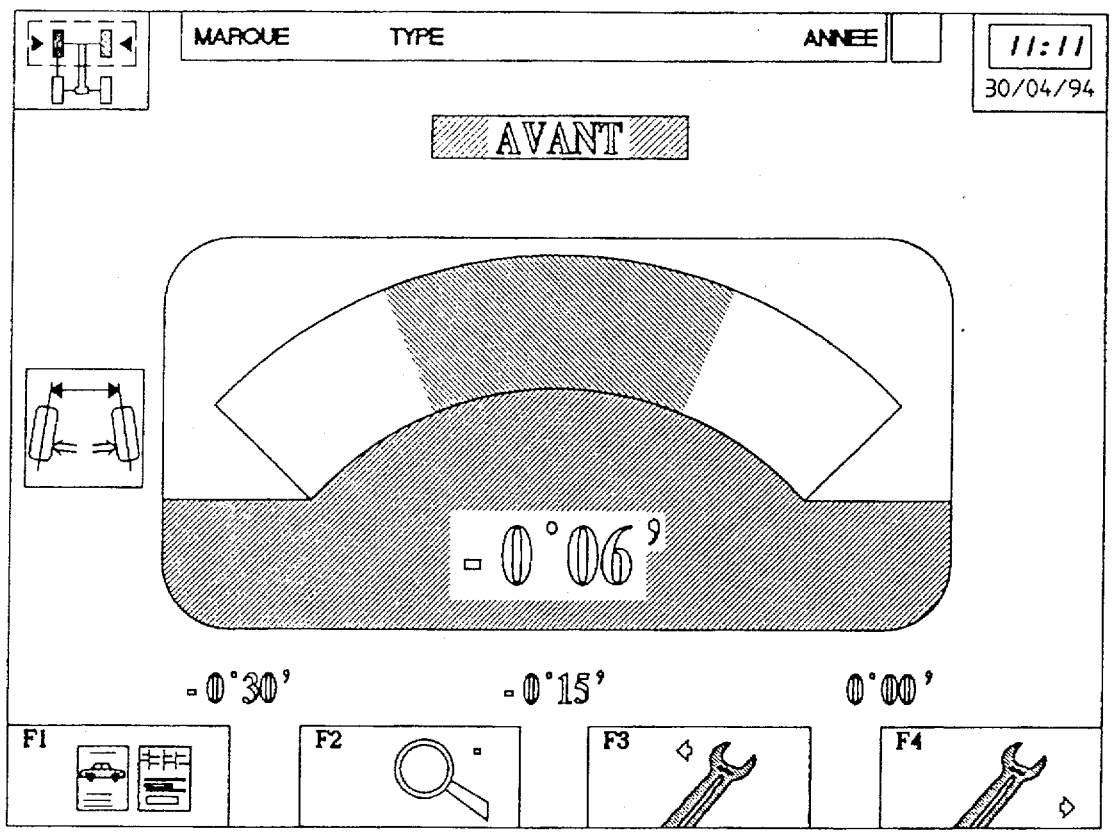

After this operation, the acquisition of data effected by the display according to the invention appears automatically on the screen according to FIG. 10, which shows the indication of at least the total forward parallelism angles, total rear parallelism, individual parallelism of each forward or rear wheel with reference to the axis of symmetry or the geometric thrust axis of the vehicle, body work, chassis, pivot, included angle, offset (angular difference between the geometric thrust axis and the axis of symmetry), and if desired "forward setback" and "rear setback" (lateral setback of a front or rear wheel in the longitudinal direction). The display of FIG. 10 is effected according to a colored indication: preferably, the angles measured or calculated corresponding to the admissible range according to the database containing the references of the vehicle are shown in green, while the values measured or calculated of the physical condition of the vehicle apart from the database of the characteristics of the vehicle are shown in red and indicate to the operator that an ADJUSTMENT will be necessary.

For purposes of verification, the operator can immediately consult the database of the characteristics of the vehicle by pressing on the key F1, which triggers immediately the appearance of a screen comprising minimum and maximum admissible values as well as the nominal values predetermined by the manufacturer for the geometric characteristics of the vehicle of the type and of the model year in question. The reference database also contains values of wheel base, track or transverse wheel base, and pneumatic pressures predetermined for the vehicle in course of inspection, which supplies to the operator a supplemental indication as to non-conformity or anomalies of the vehicle in question.

Figure 6:
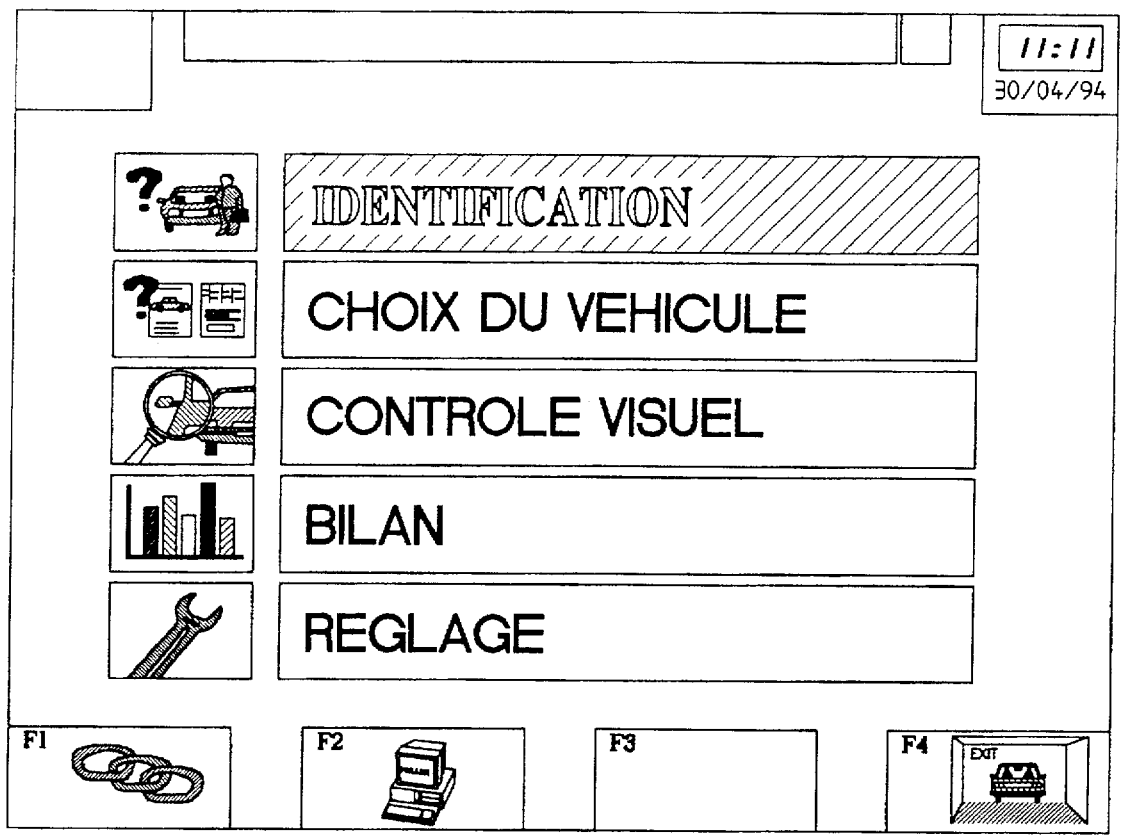
FIGS. 6–20 show schematically pages from the conversational instructional screen for guidance of the operator of the device according to the invention.
Figure 7:
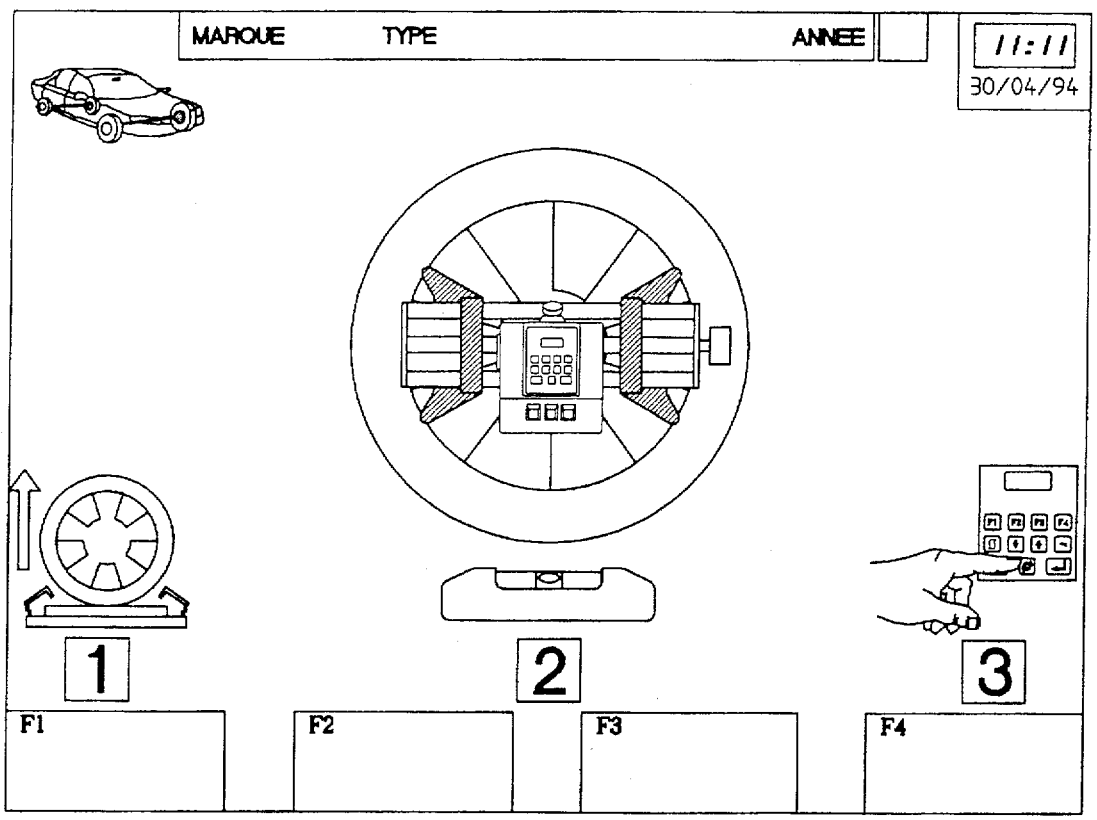

In the case of an adjustment, the operator returns to the display screen of FIG. 6 and selects the ADJUSTMENT program, which immediately causes display of the screen of FIG. 10, on which the permissible angles are represented on a green background and the angles exceeding the admissible values are indicated on a red background. Of course, the invention is also applicable to any other color code used to represent the measurements and geometric characteristics of the vehicle. The manufacturer's database immediately displays the indication of the axles adapted to be corrected, because of having an original adjustment provided by the manufacturer. The display screen 10A comprises a first line representing parallelism of the front left wheel (–0° 06') and of the right front wheel (–0° 01'), the angle to the vertical of the front left wheel (–0° 45') and of the right front wheel (–0° 15'), the angle to the vertical of the pivot of the front left wheel (+3° 30') and of the front right wheel (+3° 42'). In the ADJUSTMENT program, the key F1 is preprogrammed to call up the reference database, the key F2 is programmed to achieve an enlargement as desired of one of the selected angular sectors, the key F3 permits displaying alternatively the characteristic values of the forward axle or of the rear axle and the key F4 corresponds to indications of adjustment which are described above.

After having pressed on the key F2, the enlargement (FIG. 10B) of the upper right sector which corresponds to the parallelism angle of the front left wheel is enlarged and occupies substantially all the screen. The vehicle wheel corresponding to the angle measured in real time is referenced by a different color in the icon located at the upper left extremity of the display screen; moreover, the indications derived from the database of the manufacturer appear on the screen, namely the minimum value (–0° 30'), the nominal value (–0° 15') and the maximum value (–0° 00') predetermined by the manufacturer for the vehicle of the type in question and for the model year in question. Thanks to this enlargement feature, the operator can directly inspect in real time the course of the angle measured while adjustments of parallelism of the front left wheel are made. Thanks to the arrowed keys of the casing 31a secured to the front left wheel, the operator can control directly the mobile central unit (UC) without leaving the vicinity of this front left wheel. For example, by pressing on the key F3, the operator can consult the measured values of the rear axle to verify that any adjustment effected on the forward axle will not interfere with the rear axle while remaining in place adjacent the left forward wheel. The key F4 permits accessing particular ADJUSTMENT subprograms designated 511 to 524 on the general organigram of FIG. 5: of course, the invention is applicable also to the case of combined complementary adjustment of the variations of parallelism as a function of the position of the vehicle. The subprograms 511 to 524 correspond substantially to extracts from FIG. 10A relating to the wheel in the course of adjustment and indicating in real time to the operator the direction (stopping or release, elongation or shortening) of the operation to be effected while indicating simultaneously to the screen in real time the exact measurements obtained from the adjustment in progress.

Once the geometric ADJUSTMENT of the vehicle is effectuated, the ADJUSTMENT program suggests to the operator to return to the principal menu of FIG. 6. In the case in which the adjustment effectuated has borne on an angle such as the angle to the vertical of the wheel pivot for which it is necessary to effect a steering angle of the wheels to obtain the measurement, the return after the ADJUSTMENT program is effected by the BALANCE program to permit effecting a new BALANCE so as to know precisely all the geometrical values of the vehicle, particularly the value of the angle to the vertical of the wheel pivot which results from a calculation effected from predetermined measurements with the help of the mentioned detectors. Preferably, the representation of the geometric BALANCE of the vehicle after ADJUSTMENT (FIG. 10C) is substantially identical to the representation of FIG. 10.

After having effected the geometric physical inspection of the vehicle, the editing and reproduction of the measurements effected before ADJUSTMENT and after ADJUSTMENT, of the corresponding data of the basis of the characteristics of the vehicle inspected, the general identification data of the vehicle, of the driver or of the owner, of the operator having effected the geometric inspection can be effected in whole or in part with the aid of various selection programs which are called up by pressing on the key F9 of a control keyboard 31 or 31A. This program for editing of the measurement of the numerical or alphanumerical data, of graphs will not be further described in detail in the framework of the present application. When the operations of geometrical inspection and adjustment to be effected on the vehicle are completed, and the editing of the required data for presentation to the client is completed, when no other task is to be undertaken as to the vehicle, the operator presses key F4 of a control keyboard 31 or 31A, according to the representation of FIG. 6 showing a key F4 with the indication for vehicle discharge.

At this time, the general configuration of data control and measurements entered into the program of the central unit in the form of USES effects automatically the storage (program 65) of the balance with identification of the client and memorization of the visual inspection. This operation thus permits giving rise progressively to one or several databases relative to the clientele permitting speeding further the geometric inspection, at least as to securing IDENTIFICATION information (first program) and VEHICLE CHOICE (second program).

The device according to the invention is also configured to effect a standardization of the measuring detectors and a standardization of the lifting bridge or of the geometric emplacement on which rest the wheels of the vehicle. To this end, the test program of the detectors is selected (program 63) or the standardization program (program 66) is selected, which permits in a manner analogous to that which has been described for the general BALANCE and ADJUST program to guide the operator by indicating to him the operations to be carried out to standardize without error the detectors and to measure the characteristics of the lifting bridge or of the geometric emplacement on which the vehicle rests during geometric inspection.

Thus, thanks to the invention, the productivity of the geometric inspection and adjustment operations is greatly augmented and this without risk of error because of the fact that a representation of the parameters and physical measurements which has been taken, is continuously displayed in real time on the screen and corresponds to the steps taken by the operator which consequently take account instantaneously of the overall reactions of the vehicle and of the device to these steps.

Moreover, the general program whose organogram is shown in FIG. 5 is particularly appropriate in that it uses two chaining programs of the operations and chaining of the adjustments (programs 613 and 614) which permit the operator to redefine the operative modules for effecting measurements on the vehicle or for effecting adjustments on the vehicle and the modules concerning the data processing, so as to permit if desired performing on certain vehicles only the RAPID BALANCE in the case in which these vehicles have well known characteristic defects that do not justify the taking of certain characteristic geometric measurements or certain adjustments. Moreover, this modularity and this functionality permit selecting among the manual performance of certain steps of the process or the automatic carrying out as soon as the operator has higher output measurements: for example, in the case in which the operator does not have pivoting plates with drive rollers to effect wheel alignment, the operator effects wheel alignment manually from the indications on the screen; when the operator has pivoting plates with drive rollers for wheel alignment, he selects the automatic option within a principal wheel alignment program.

The controller of the geometric control space in which the device according to the present invention is installed has the STANDARDIZATION program to which access is had from the control keyboard by selection of the STANDARDIZATION mode.

To this end, a standardization bar of predetermined geometric and dynamic characteristics is preferably supplied with the device according to the invention. The display screen indicates to the operator to take the identification number of the standardization bar and the factory calibration number of the standardization bar and then to effect the validation by pressing on the corresponding key.

Thanks to this standardization bar, it is possible to effect the standardization of the zero of the inclinometers, the standardization of the zero of the lateral detectors, the standardization of zero of the transverse detectors, the verification of the gains of the detectors and the standardization of one or several workstations in their entirety.

Figure 11:
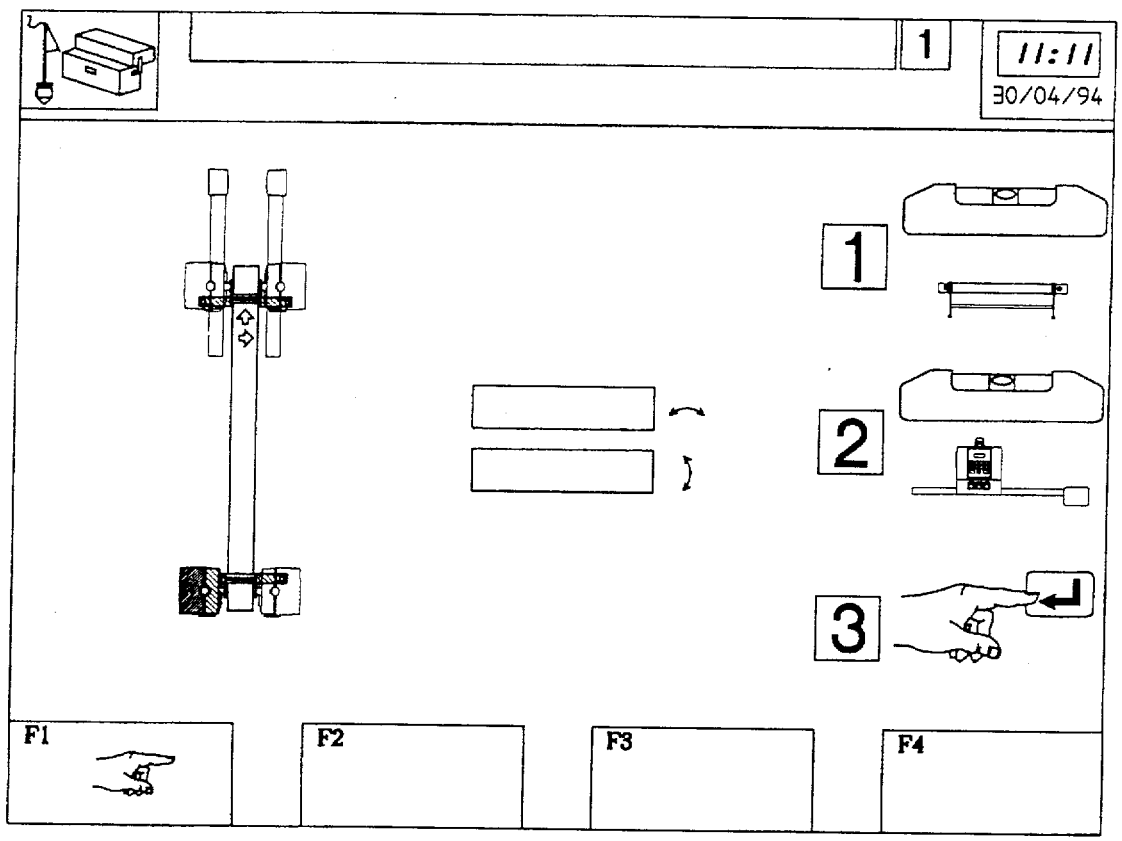
Figure 11:
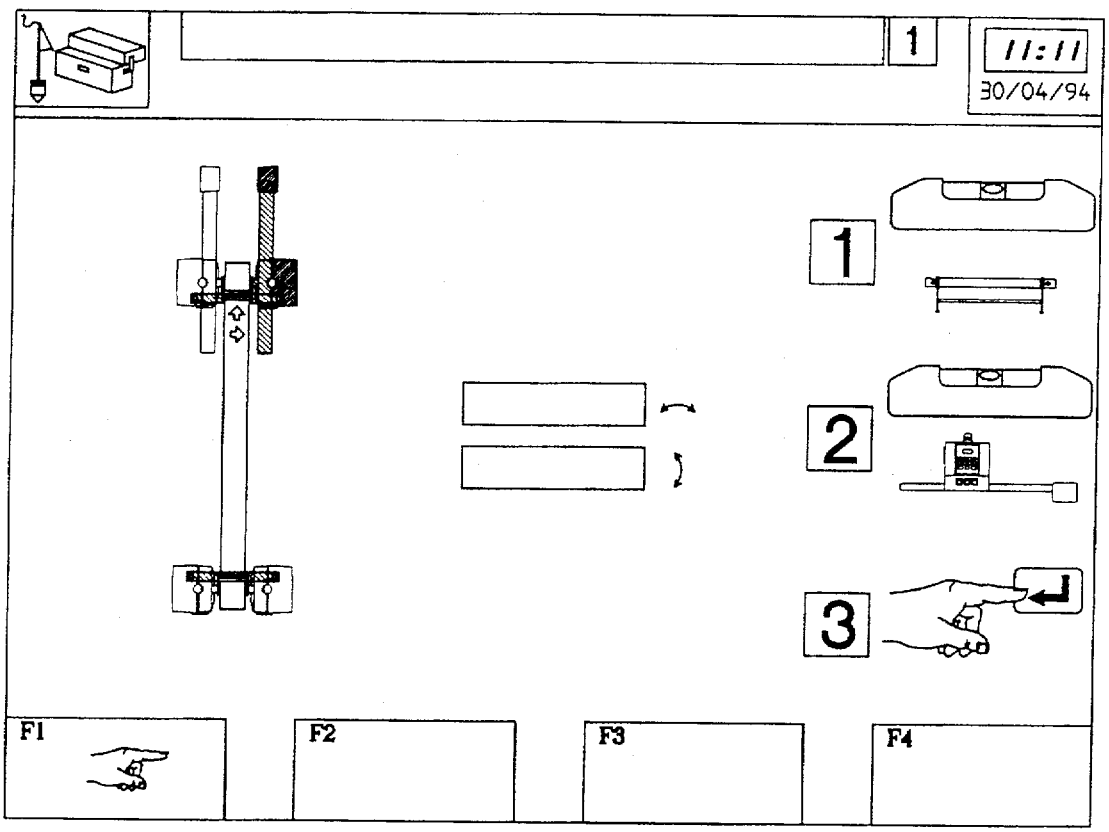

FIG. 11A or 11B guides the operator to effect the standardization of zero of the inclinometers:

1. by securing a casing to the standardization bar and leveling the standardized bar, 2. placing the casing (FIG. 11A) or the arm (FIG. 11B) to be standardized also as to level and then to validate so as to indicate to the apparatus according to the invention that the preliminary operations have been effected; the apparatus according to the invention then automatically effects the standardization of zero of the inclinometers by measuring these values and by memorizing them as parameters for the corresponding physical computation.

Figure 12:
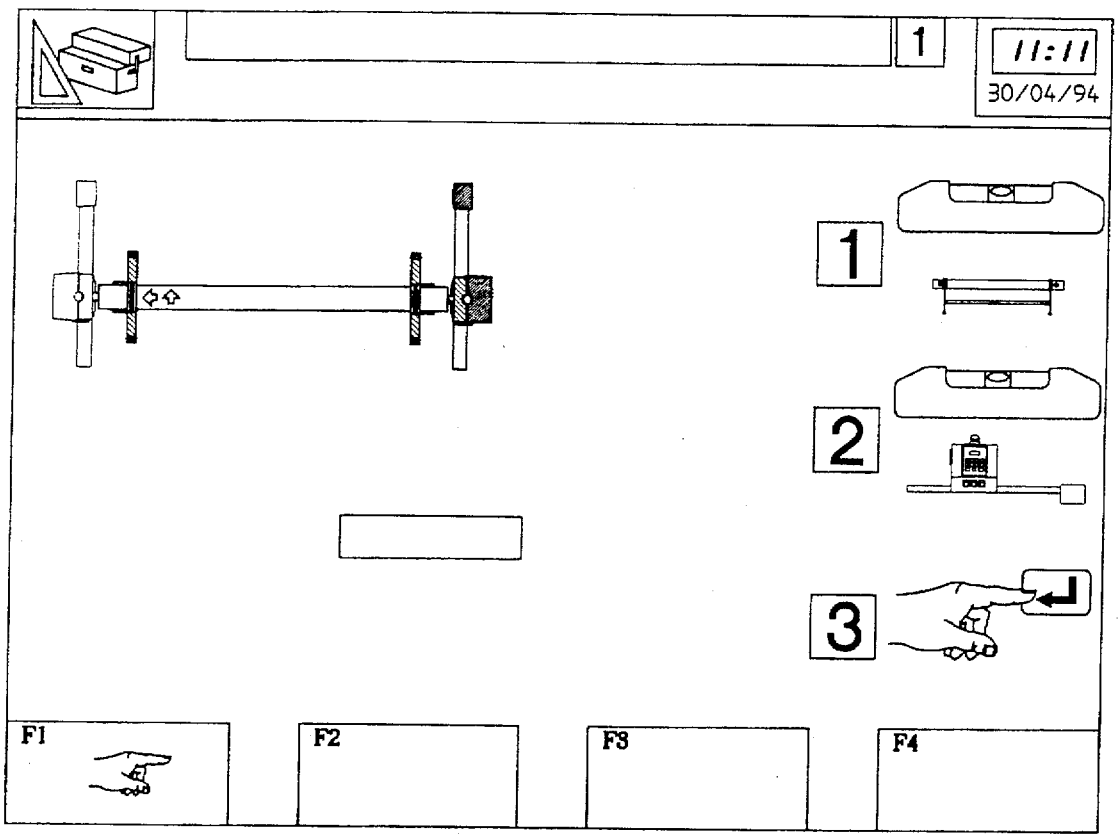
Figure 13:
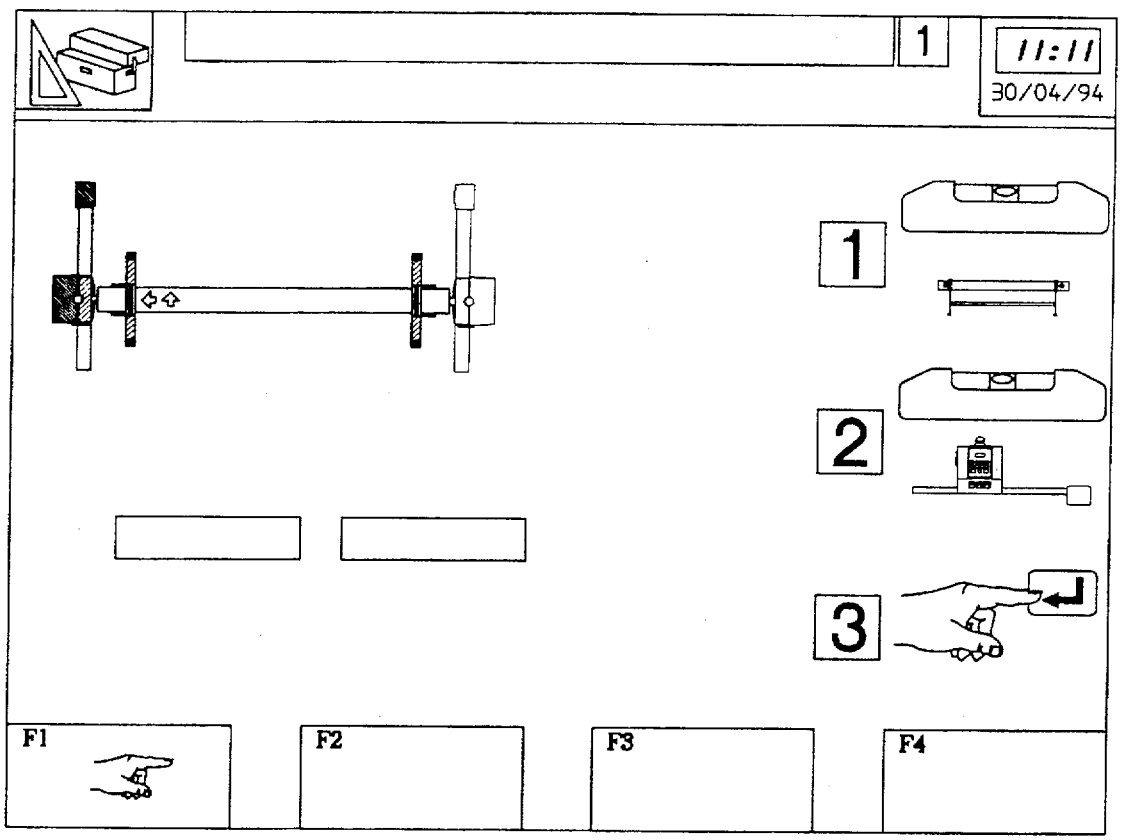

The operator also follows the directions shown in FIGS. 12 and 13 so as to effect the standardization of zero of the transverse detectors.

The operator effects in an analogous manner and by means of analogous indications with the help of the directions given by the corresponding display screens in FIG. 12, the zero standardization of the lateral detectors.

Figure 14:
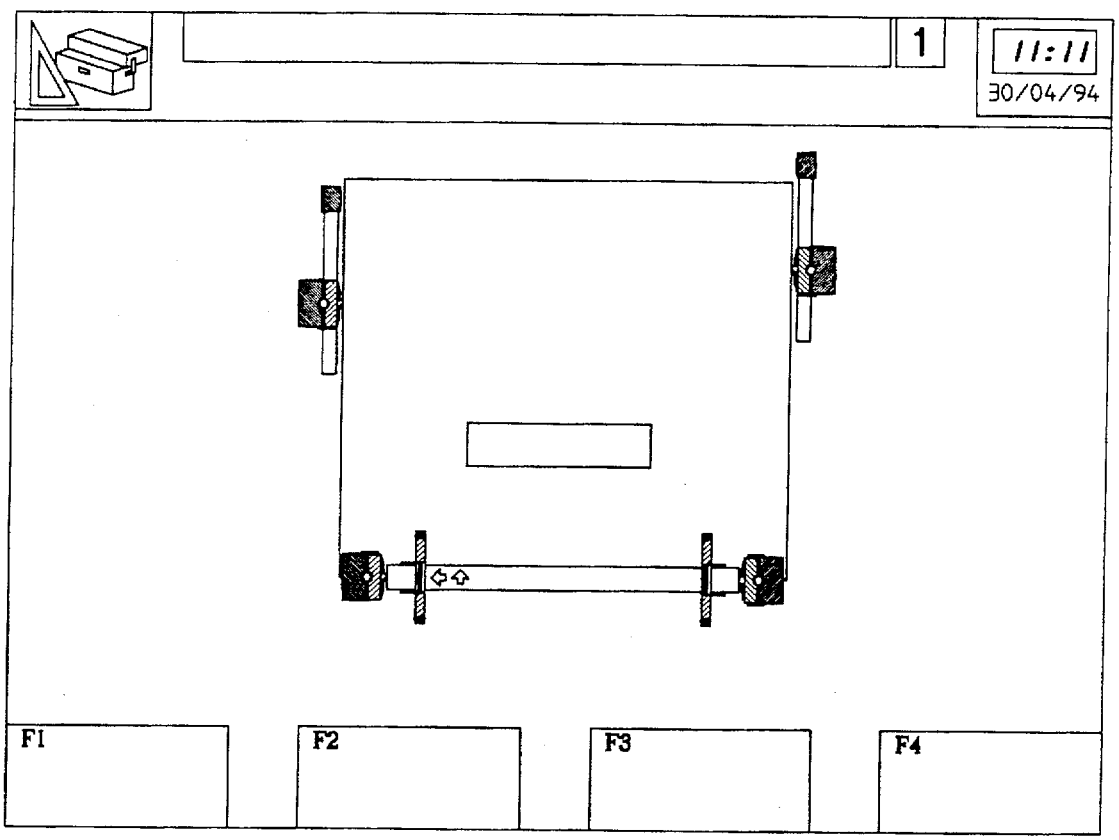

To effect verification of the gains of the detectors, the operator effects according to the instructions of FIG. 14 a complete mounting of the arms and of the casings on a standardization tool supplied with the device according to the invention. After having effected the display of FIG. 14, the operator presses only on the validation key and the device according to the invention automatically effects the verification of the gains of all the measuring instruments of the device according to the invention.

Figure 15:
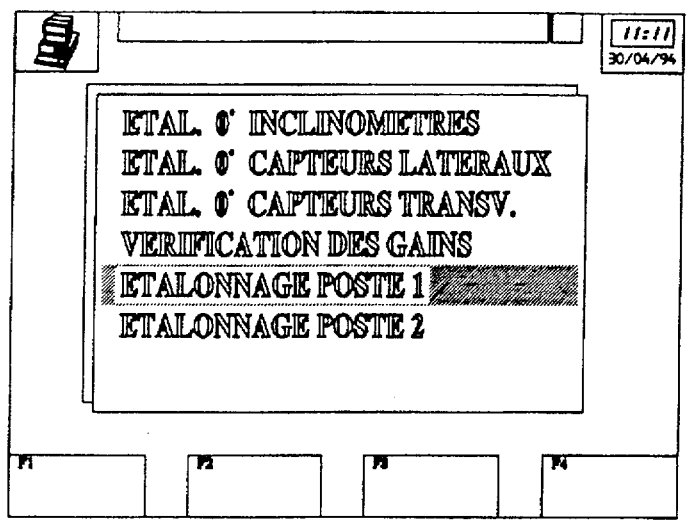
Figure 16:
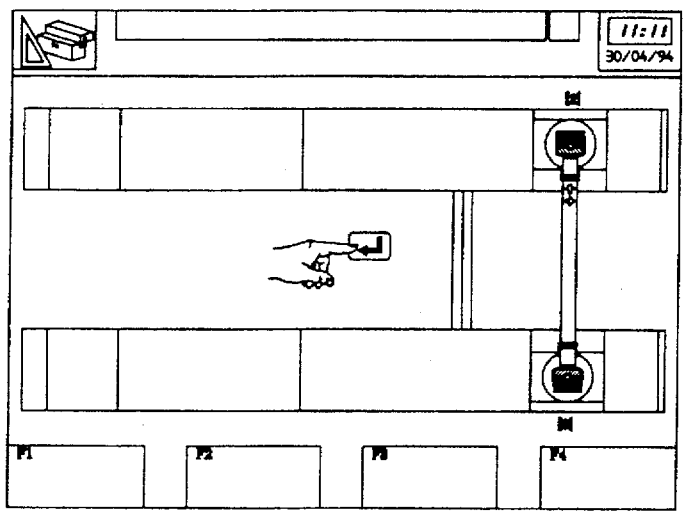
Figure 17:
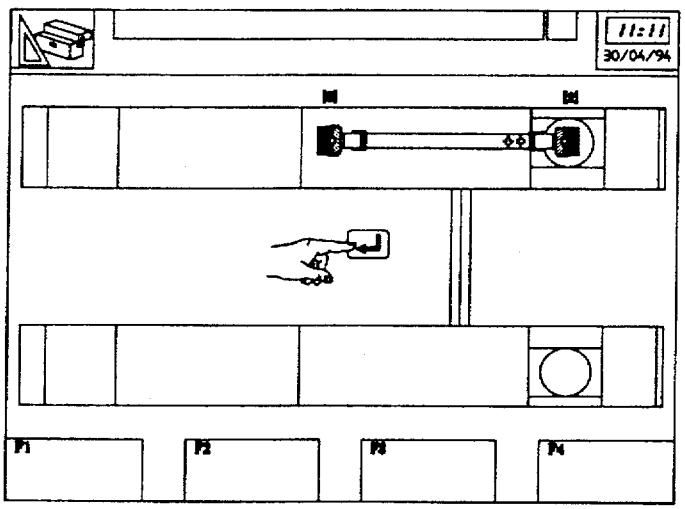
Figure 18:
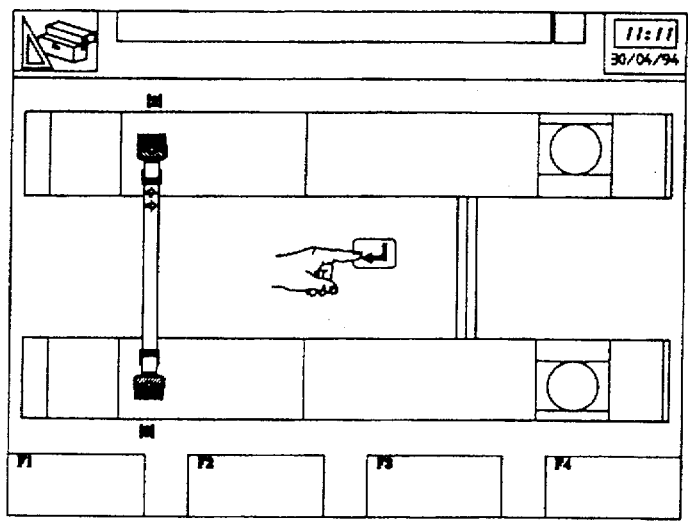
Figure 19:
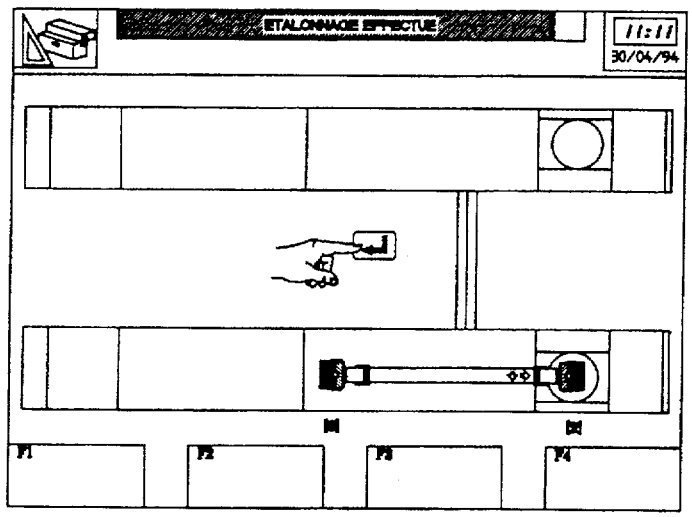
Figure 20:
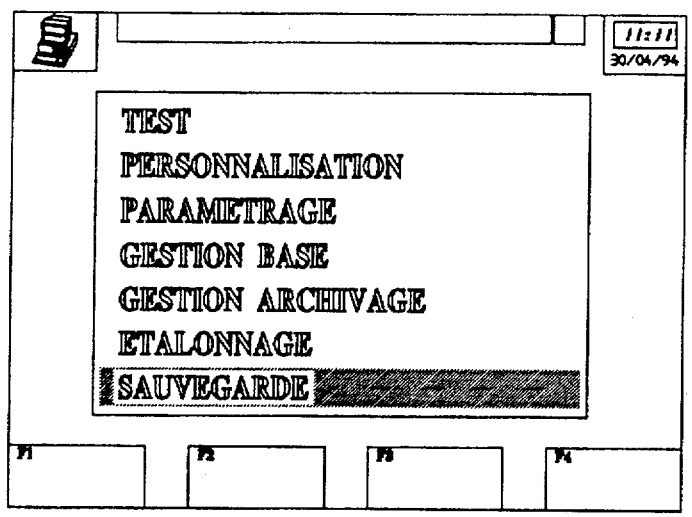

In case of shocks applied to the elevator bridge or at periodical predetermined intervals, the operator effects also the complete standardization of the workstation, constituted in general by an elevating bridge adapted to receive a vehicle to be inspected. To carry out standardization of the workstation, the operator selects the corresponding menu or program (FIG. 15) and effects the montage shown on the screen according to FIG. 16, then he validates the operation to indicate to the apparatus according to the invention that he has effected the indicated operation; then, he emplaces the standardization tool according to FIG. 7 longitudinally from one side and he also validates it to indicate the apparatus according to the invention to proceed with corresponding measurements and to memorize them; finally, he emplaces the standardization tool transversely to the emplacement of the rear wheels (FIG. 18) and he also validates and finally puts in place the standardization tool longitudinally on the path that has not been measured with the aid of the montage of FIG. 19 and he validates the operation: the apparatus according to the invention then automatically calculates the characteristics of the workstation or raising bridge adapted to receive a vehicle to be inspected. The apparatus according to the invention stores upon command (FIG. 20) all the zero values of the detectors, of gain standardizers and workstation or elevator bridge standardizers as real parameters and effects as a result the corrections necessary to take account of the geometric condition of the workstation or of the elevating bridge and of the physical condition of the detectors.

Figure 21:
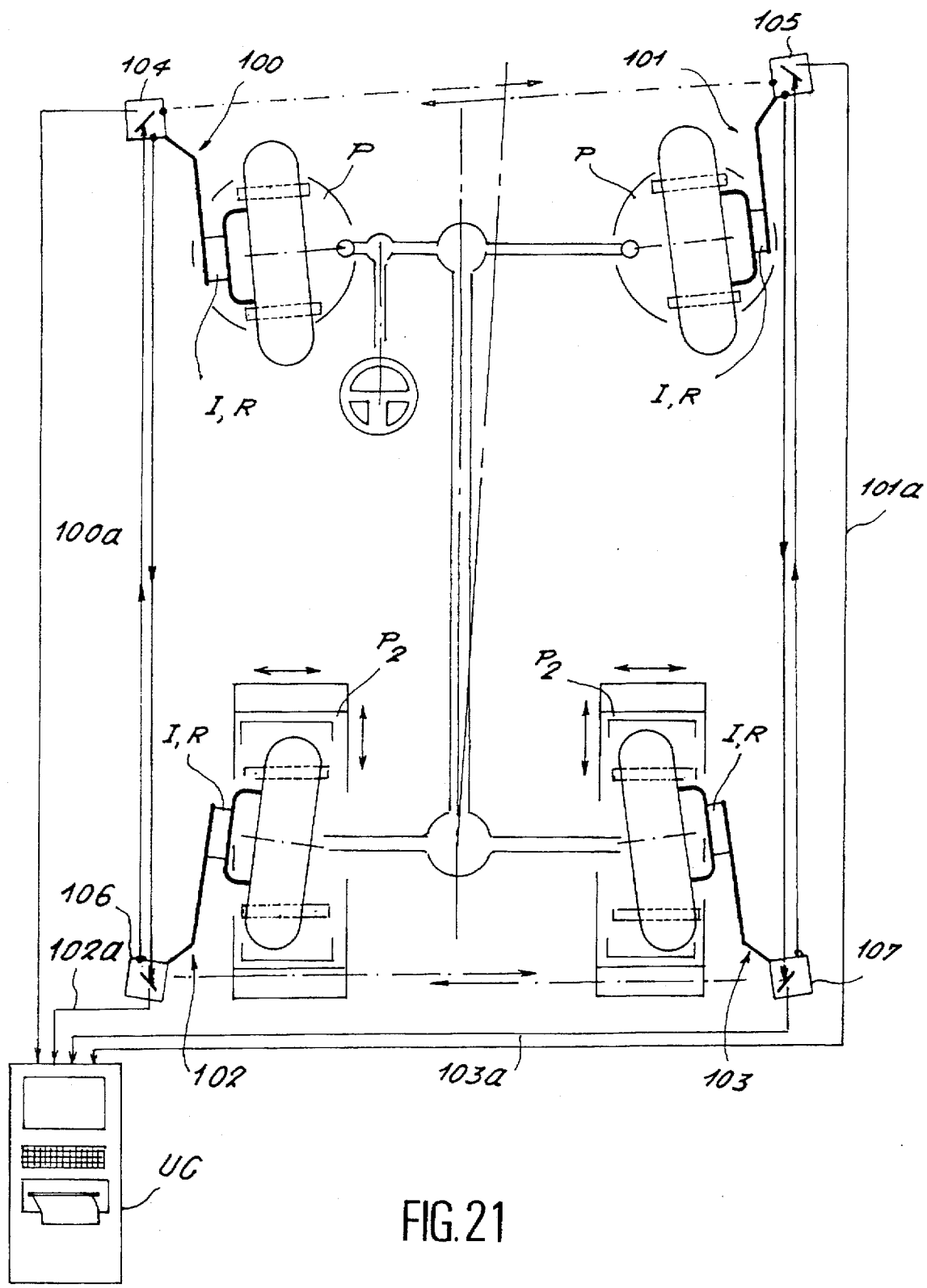
FIG. 21 shows schematically a view from above of another embodiment of the invention.
Figure 22:
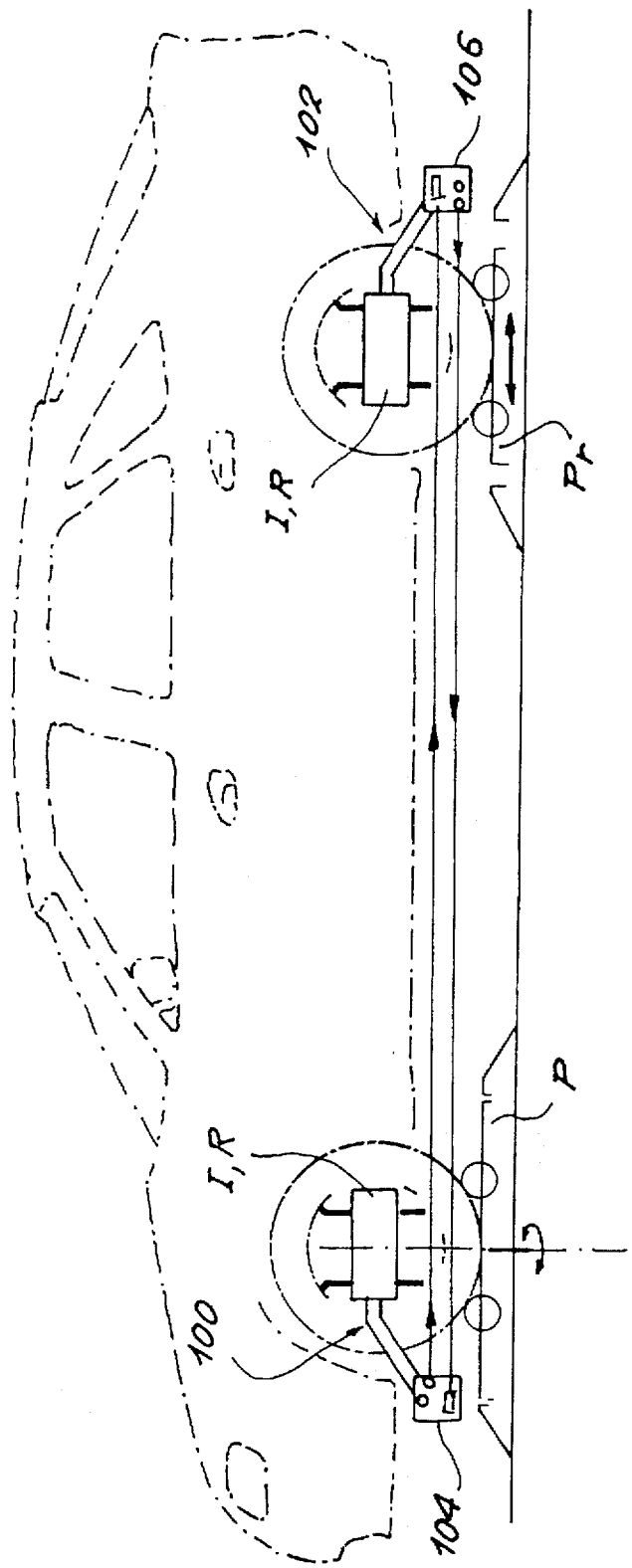
FIG. 22 shows schematically a side view of an apparatus according to the invention in mounted position.
Figure 23:
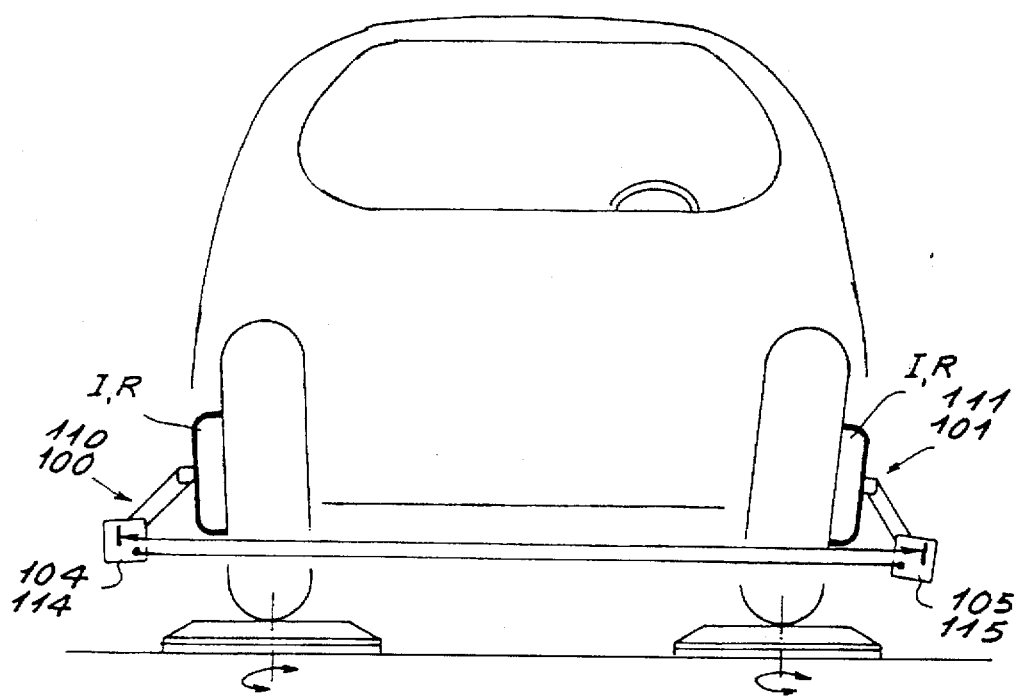
FIG. 23 shows schematically a front view of an apparatus according to the invention corresponding to FIGS. 21 and 22, or to FIGS. 27 and 28.

With reference to FIGS. 21, 22 and 23, another embodiment of the apparatus according to the invention for geometric inspection of a wheeled vehicle is shown in position mounted on a vehicle shown schematically in FIG. 22 and 23 and shown without body work in FIG. 21.

The apparatus comprises a central unit UC analogous to that described with reference to FIG. 4 connected by communication means 100a, 101a, 102a, 103a to measuring arms 100, 101, 102 and 103. The communication means 101a to 103a are shown in FIG. 21, according to a branched network: of course, the invention is applicable to any other arrangement of the communication scheme by wired or wireless connection (radio, infrared radiation, sonic transmission).

Each measuring arm 100 to 103 comprises on the one hand a casing fixed by hooks on the wheel and containing circuits of an inclinometer I and of a potentiometer R described with reference to FIG. 4 which coacts with block cameras placed at the ends of the arms 100 to 103 which extend externally of the vehicle in front of the front wheels and behind the rear wheels. Each block camera 104 to 107 disposed respectively at the end of a rigid support of a measuring arm 100 to 103 is a block camera provided with a multi-directional optical receiver and with a multi-directional source of light emission or with two unidirectional sources of light emission.

The optical receiver, particularly a detector of the CCD type, is arranged in a direction forming substantially an angle of 45° in the horizontal plane with the longitudinal axis of the vehicle. This preferable arrangement thus permits saving during manufacture of this modification of the device four optical reception blocks comprising an optical detector (of the CCD type) and an associated electronic circuit. The discrimination of the measurements in the transverse direction and the measurements in the longitudinal direction is effected simply by adopting a transverse mask comprising slots of a width substantially different from the width of the slots of the longitudinal mask disposed on another surface of the cube corresponding to the configuration of a block camera 104 to 107 of FIGS. 21 to 23. The discrimination of the instant light rays by means of slots of different width has been described in particular in French patent application 93 12059, unpublished.

The block cameras 104 and 107 are mounted spaced transversely and longitudinally from the wheels according to a predetermined transverse distance such that the longitudinal light beam from block camera 104 will not be cut by the tire of the left wheel during steering to the right and such that the longitudinal light ray from the block camera 105 will not be cut by the tire of the right wheel during steering to the left and also, in a manner known per se, according to a longitudinal distance corresponding substantially to the length of the rigid support of a measuring arm sufficient such that the light beam will not be cut by the front or rear tires of the corresponding wheels or will not encounter any member of the type of a spoiler, shock shield, etc. Thanks to this modification of the invention, steering for measurement of the angle to the vertical of the wheel pivot and of pivoting is effected without difficulty for steering values of 10° or 20°.

According to a less preferred modification of the invention, the light sources of the block cameras 104 to 107 do not all emit simultaneously, but emit, on the contrary, sequentially: in this case, it is possible to adopt identical slot widths for the transverse and longitudinal masks, because the discrimination will be timed and not geometric. Preferably, in the two cases, the block cameras 104 to 107 are disposed downwardly with respect to the axis of the wheel such that the casing containing an inclinometer I and the potentiometer. R will not constitute an obstacle to light communication between casings, both in the centered position direction and in the maximum right or left steering position.

In FIGS. 21 and 22, there is shown a pivoting plate P comprising two drive rollers for the automatic wheel alignment of each wheel, as well as clearance plates Pr also comprising rollers for driving in rotation the rear wheels for wheel alignment. This arrangement described with reference to the preceding figures is also applicable to this modification.

According to another modification applicable to all apparati according to the present application, the apparati comprise remote starting means or teleloading for the remote loading of information from a databank: these remote starting means permit leaving a central unit in active position, even in the absence of a vehicle, which permits a client desiring to have a meeting to telephone directly to the central unit while supplying by means of a personalized code references to the client and vehicle, such that, when the client arrives in his vehicle, the apparatus can automatically start the balancing or adjusting operations without any loss of time required by taking information or identification of the vehicle; similarly, in case of doubt, the remote loading permits remotely acquiring information from a databank of an automotive manufacturer to know the false characteristic of a given type of vehicle; finally, the apparatus can comprise a subprogram for controlling the working time permitting effecting the remote starting at a predetermined time and stopping of the work at a predetermined time, such that the use of the apparatus is entirely remotely controlled thereby avoiding any risk of fraudulent use.

According to still another embodiment of the invention, the apparati comprise telediagnostic or telemaintenance means, for taking information on the condition of the device by technical telecommunication means (telephone, telecopier, telex, teletext, vocal interrogation and control) or for supplying instructions for repair or adjustment so as to remedy a particular anomaly identified by the databank of the manufacturer of the apparatus; these telediagnostic or telemaintenance means can also comprise telematic means or interactive mass means of the CD ROM type of CID (compact interactive disk).

Figure 24:
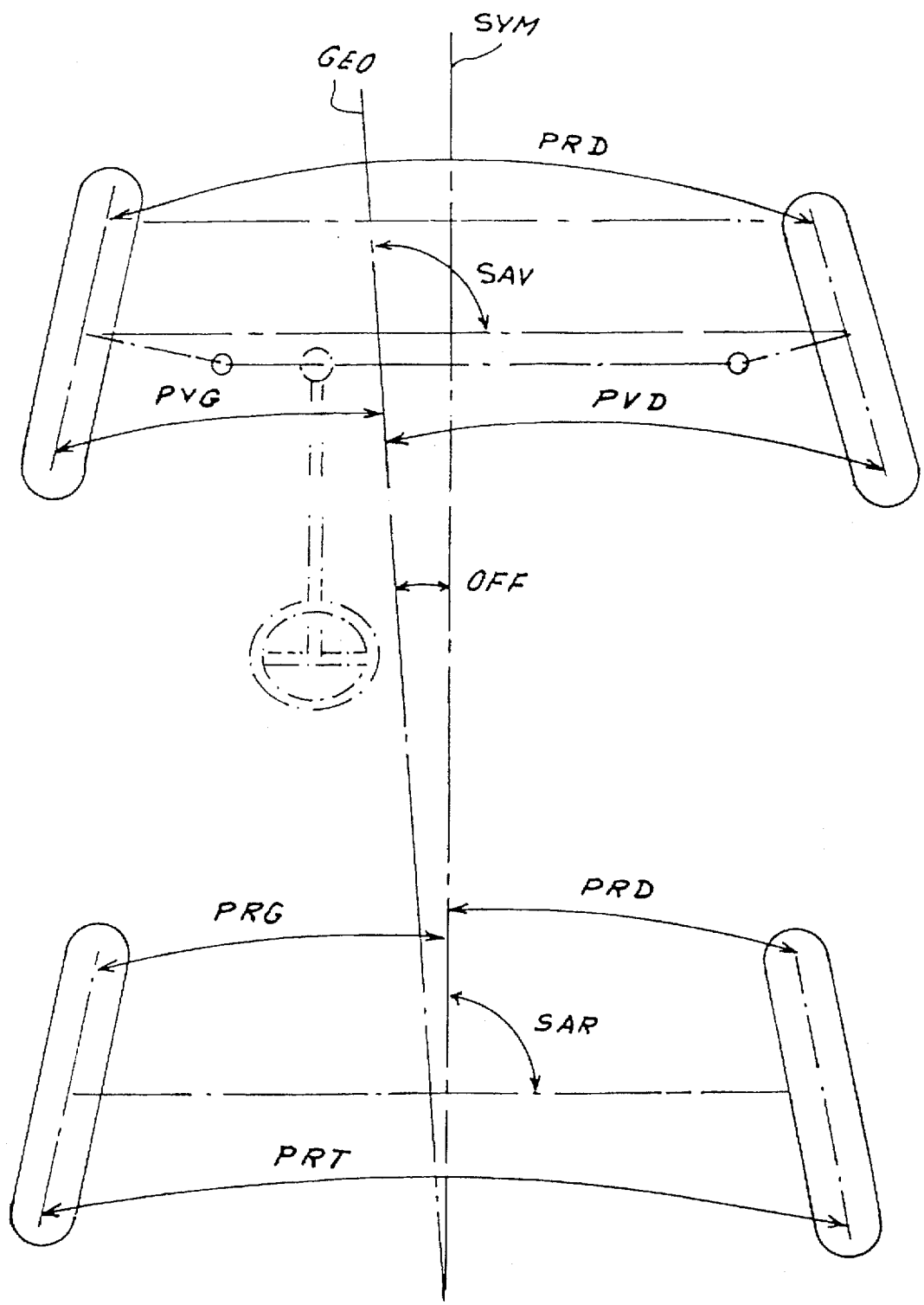
FIG. 24 is a geometric schematic view showing the angles of parallelism to be determined.

FIG. 24 shows the geometric arrangement of the geometrical characteristics of parallelism of the vehicle which can be easily obtained by means of equations of a known type thanks to this modification of the invention.

The front left angles of parallelism PVG and front right PVD, of "forward setback" SAV (forward setback) relative to the geometrical axis, of total forward PRD parallelism, of left rear parallelism PRG, right rear PRD and "rear setback" SAR (rear setback) relative to the axis of symmetry of total rear parallelism and setback OFF of the geometric axis relative to the axis of symmetry are shown relative to the usual reference constituted by the geometric axis GEO and the axis of symmetry SYM. Of course, the central unit CU could, by simply pressing a control key, change as to reference and recalculate the angles relative to a selected axis definable relative to the vehicle.

Figure 25:
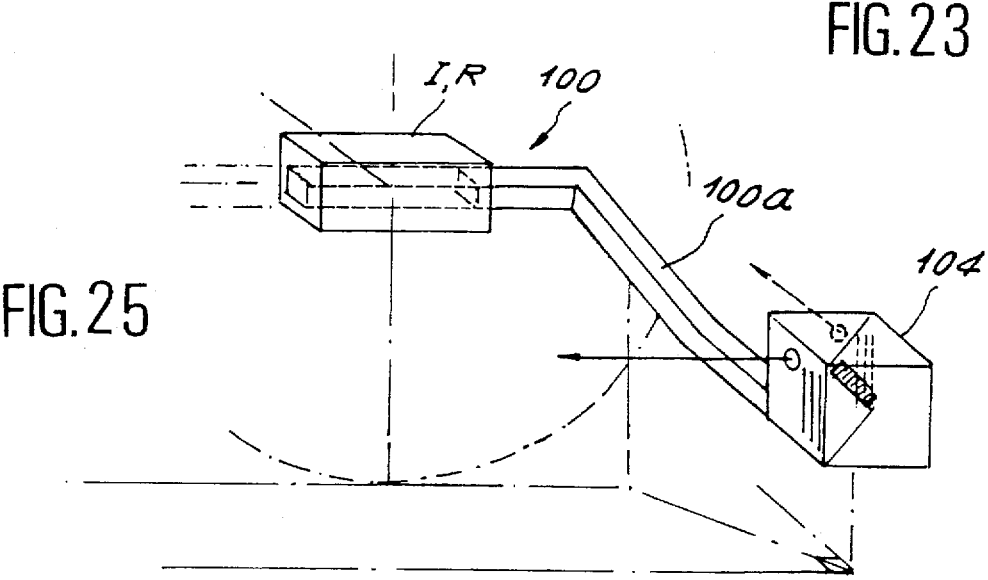
FIG. 25 is a fragmentary perspective view of a casing assembly of the device according to the invention.

Referring to FIG. 25, a measuring arm of type 100 is mechanically separable into two portions: a first portion constituting a housing containing an inclinometer I and a potentiometer R and a second portion constituted by the rigid support of the block camera 104 and of the block camera 104 itself. The support 100a is preferably disconnectible electrically and mechanically in a simultaneous manner, upon separating the arm 100a of the casing fixed by a hook to the wheel rim. Thus, it is not necessary to undo the hooks and the casings containing the potentiometers R and the inclinometers I to change the camera 104, because it suffices simply to remove the casing using a removable securement of the bayonet type or by snap fitting. As will be seen hereinafter, this arrangement permits passing easily from one configuration of outwardly oriented arms to a configuration of arms oriented inwardly of the vehicle.

Figure 26:
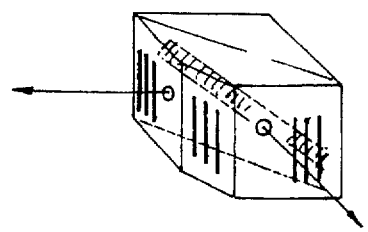
FIG. 26 shows schematically in perspective a camera assembly which is a modification of the embodiment of FIG. 25.

FIG. 26 shows a block camera of a casing which comprises several slotted masks or image definition lens on an optical receiver, particularly a CCD detector and three slotted masks each comprising three slots, disposed on opposite sides of light sources emitting active transverse and longitudinal beams.

Figure 27:
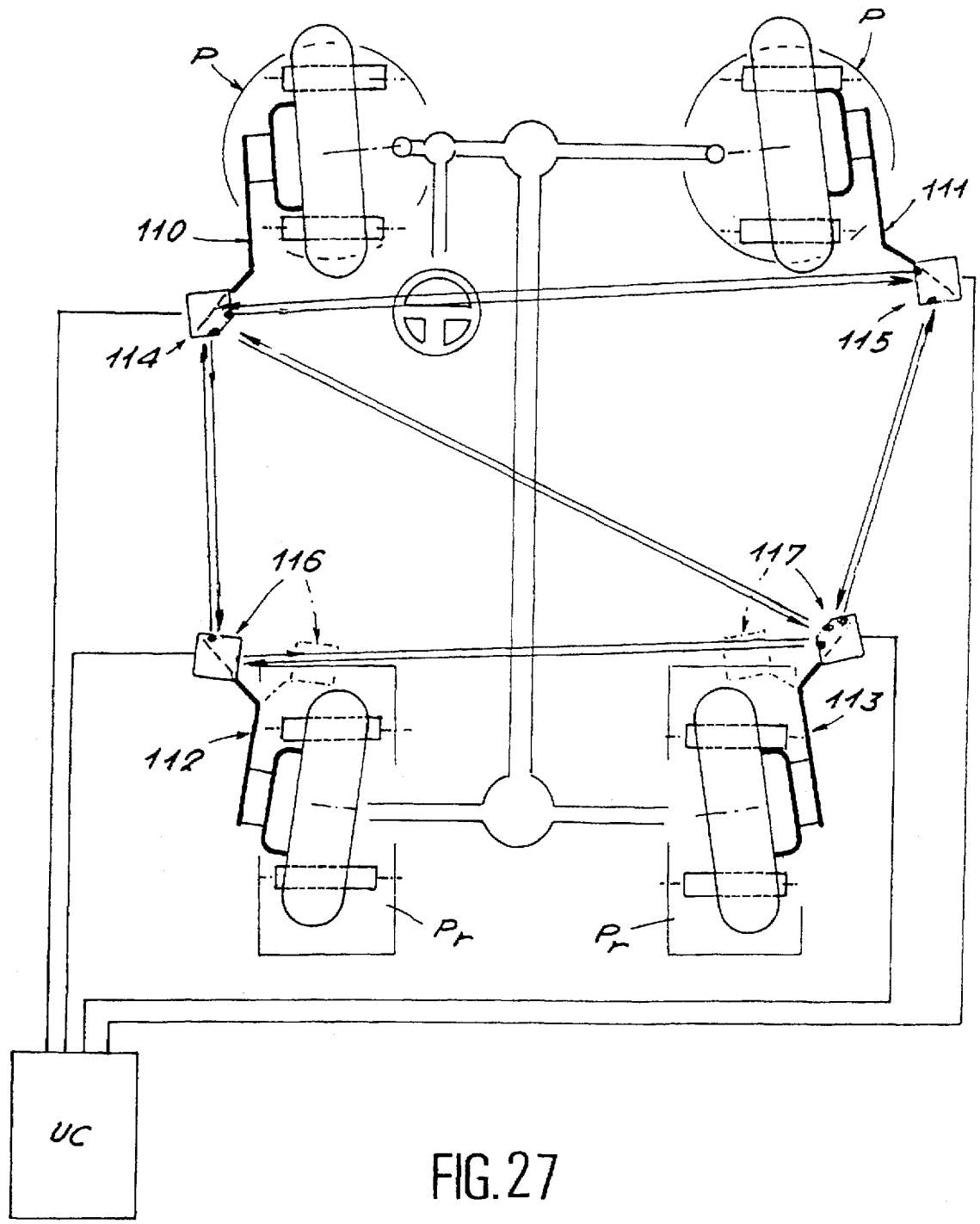
FIGS. 27 and 28 show schematically a view from above and a side view of another embodiment of the invention.
Figure 28:
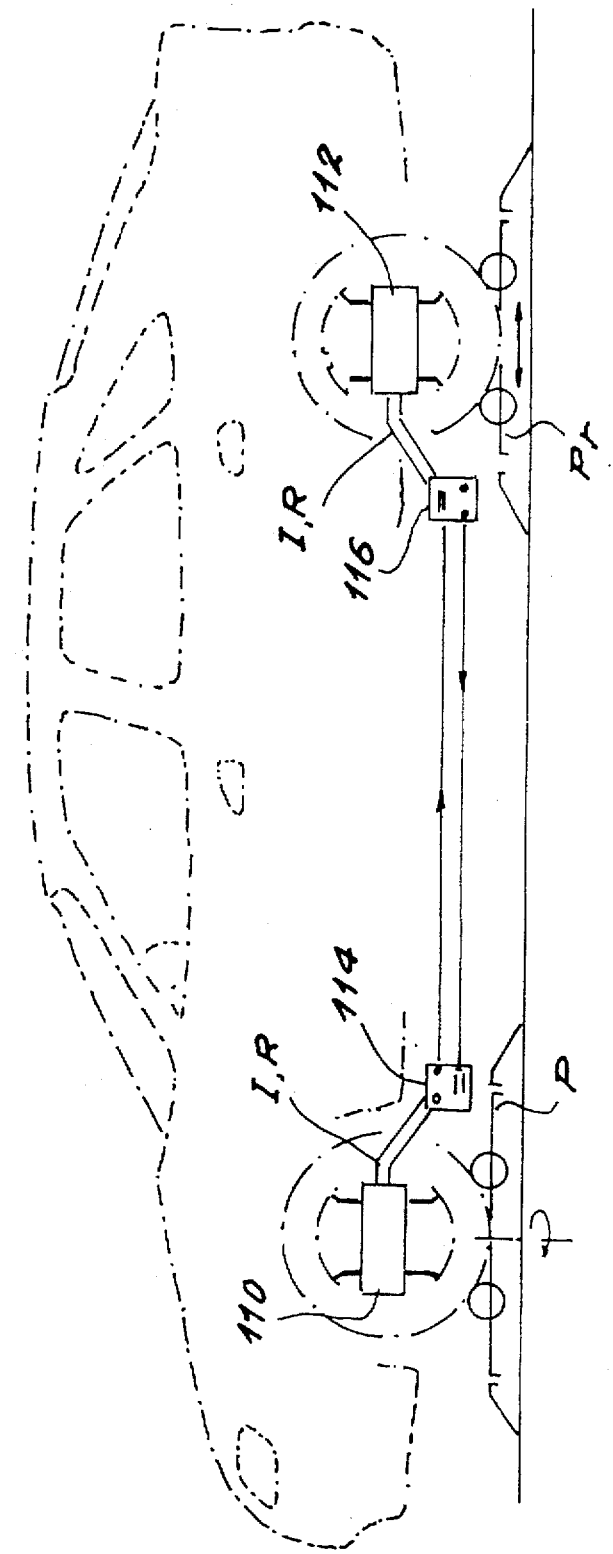

Referring to FIGS. 27, 28 and 23, another device according to the invention comprises arms 110 to 113 disposed inwardly of the vehicle, at the end of which are disposed block cameras 114 to 117 adapted to communicate optically between themselves or to effect geometric measurements not only angularly but also distance measurements along at least one diagonal or quadrilateral defined by the block cameras 114 to 117.

French patent application 93.12059, unpublished, describes the general principle of the dimensional measurements which can be obtained with the help of a block camera having several slots.

Knowing the principle of physical measurement, one skilled in the art can carry out by simple geometrical computations the determination of the distances between the block cameras and thus can obtain not only the characteristics of parallelism, but also the characteristics of track and wheel base of the vehicle permitting in particular inspecting the dimensional characteristics of the axles or the good securement of the wheels to the axles of the vehicle.

In FIG. 27, the arms 110 to 113 are disposed such that the cameras 114 to 117 will be disposed inwardly of the vehicle wheels in the direction of the longitudinal direction but externally transversely.

One could also, as shown in broken lines for the block cameras 116 and 117 secured to the rear wheels of the vehicle, arrange the arms 112 and 113 such that the block cameras 116, 117 will be disposed both internally longitudinally and internally transversely: this arrangement further reduces the size of the quadrilateral defined by the block cameras 114 to 117 and correspondingly increases the precision of measurement, particularly of dimensional measurement.

Preferably, this arrangement is particularly used when there is an elevating bridge comprising support plates for raised wheels so as to provide a passage for the paths of action of the block cameras below the vehicle or alternatively, for the passage of the block cameras 114 to 117 themselves, as shown by way of example in broken lines for block cameras 116 and 117.

Preferably, the elevating bridge comprising support plates for wheels is also provided with drive rollers adapted to come into contact with the vehicle wheels to ensure an automatic wheel alignment: these rollers can be permanently fixed on pivoting plates P or on clearance plates Pr or else can be withdrawn during pivoting of the plates P comprising an electric signal outlet representative of the steering angle of the front axle or can be withdrawn into clearance plates Pr after alignment of the rear wheels of the vehicle.

To pass from a position 116 shown in broken line to a position 116 shown in full line, provision is made that a block camera 116 or 117 is mounted mechanically so as to be able to turn 90° or 180°, so as always to present an optically active receiving face during mounting of a device according to the invention with the aid of modular elements comprising block cameras which are disconnectible, lockable, snap-in or mechanically and electrically detachable from a rigid support or from a connection casing as shown in FIG. 25: one skilled in the art will be able to determine without difficulty the mechanical mountings permitting presenting the block camera so as to effect optical communication with another confronting block camera.

The block cameras 114 to 117 each facing three others are preferably of the type shown in FIG. 26.

Figure 29:
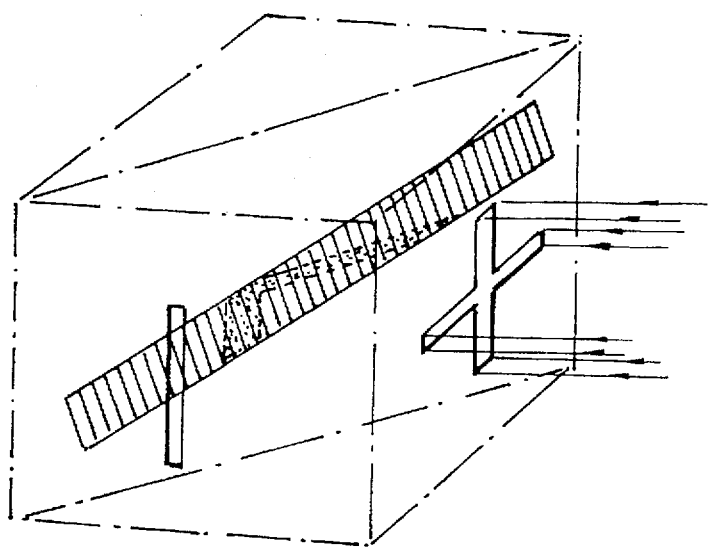
FIG. 29 shows schematically an embodiment of a casing camera of a device according to the invention.

FIG. 29 shows another embodiment of block camera according to the invention: one of the masks comprises two slots of unequal width forming a cross, which permits simultaneous measurement of the angles in the horizontal plane and in the vertical plane; by arranging a plurality of vertical slots and a plurality of horizontal slots, the width of the horizontal slots being substantially different from the width of the vertical slots, there are thus obtained measurements both angular and dimensional, relative to the vertical and relative to the horizontal, by means of a single detector of the CCD type or the like.

Figure 30:
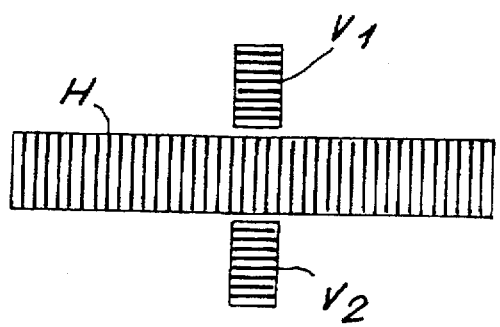
FIG. 30 shows schematically a modification of the optical receiver according to the invention adapted to be mounted in a camera of the type of that of FIG. 29.

FIG. 30 shows a particular case of CCD detector comprising three linear bars forming a cross, a horizontal bar H and two vertical bars V1 and V2: in this preferred embodiment of the invention, there can be used slots disposed according to a single predetermined direction; this direction can be horizontal or vertical but could also be inclined, which greatly improves the precision of the measurements that can be effected with the invention in a manner analogous to that which is explained in the disclosure of the French patent application 93.12059 mentioned above.

Thanks to this modular construction of the block cameras that can be incorporated with or in the support arm 100a, it is possible to construct a large number of quadrilaterals with the aid of modules of the type shown in FIG. 25. Because each block camera could thus occupy three different positions, the positions inwardly of the vehicle give rise to ten different quadrilaterals, of which two are substantially adjacent one parallelogram, two substantially in the form of a trapezoid and two others substantially adjacent one rectangle, and it will be seen that there exist at least four other quadrilaterals corresponding to at least one position externally of a block camera. As a result, there exist at least ten quadrilaterals adapted to be constructed with the aid of modular block cameras by simple simultaneous mechanical and electrical snapping in, which permits, on a given vehicle, measuring with high precision, while correlating the possible errors, the characteristics of the chassis of the vehicle.

The invention is not limited to dimensional computations of the precision of the direction, of the axles or of the chassis of the vehicle, but is equally applicable to dimensional inspection of the vehicle, particularly for the dimensional inspection of the body of vehicles. Thus, by dissociating the supports 100a carrying the block cameras from the casings fixed to the wheel frames, the support 100a can be positioned at predetermined places outside the vehicle and secured to the workstation along a fixed predetermined reference base.

Although the dimensional triangulation is possible with the aid solely of three block cameras, there could preferably be used the four block cameras of an arrangement according to the invention, and, in particular, block cameras comprising masks with two slots forming a cross, such as that of FIG. 29. By thus arranging these particular block cameras of FIG. 29 in predetermined positions corresponding to known relative geometric coordinates (being able to verify and periodically calibrate with the help of a calibration program which is part of a device according to the invention), the position of a reference point of the vehicle body indicated by the manufacturer can be measured in the vertical plane and in the horizontal plane.

Figure 31:
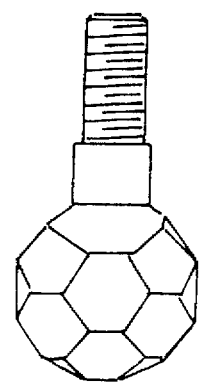
FIG. 31 shows a polyhedral retro-reflector.

The reference point of the vehicle body is located at the top of a tetrahedron or of a pyramid whose base is constituted by a triangle defined by three block cameras or by a quadrilateral defined by four block cameras. To fix precisely the position of the point of reference, one can secure to this point of reference a retroreflector with several facets such as that shown in FIG. 31 which reflects the incident rays in the direction of emission, such that the mask having a cross will define on the CCD according to FIG. 29, the image of a cross determining simultaneously the angle of horizontal site and the angle of vertical site of the retroprojector positioned in an invariable manner at the point of reference predetermined by the manufacturer.

The invention thus has the considerable advantage of providing a polyvalent tool permitting both effecting geometric inspection of the vehicle and dimensional inspection of the chassis or body of the vehicle: thus, those specializing in automotive inspection and repair need only have a base reference to snap on the supports 100a provided with block cameras, or to snap on these block cameras themselves and do not need additional inspection means of the prior art to effect the dimensional inspection of the bodies.

This results in improved precision, but also in a considerable saving of money due to the elimination of a device of the prior art for dimensional inspection of the body of the vehicle.

The invention described with reference to several particular embodiments is in no way thus limited, but covers on the contrary all modifications of shape and all variations of equivalent functional embodiment within the framework and spirit of the present invention: in particular, one or several light emission sources could be replaced by a flat mirror reflecting a light beam in a certain direction, by a retroreflector permitting the detection of particular geometric points.

We claim:

1. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a central unit (25, UC) connected by communication means to measuring casings (21, 22; 40, 41) or measuring arms (26, 27; 42, 43) of which each comprises a control keyboard (31a) permitting the control of the central unit (UC) from the corresponding said casing (40, 41) or arm (42, 43);

wherein at least one said casing (40, 41) or arm (42, 43; 100, 101; 110, 111) is connected to and communicates with a wheel pivoting plate (P) supplying an outlet electrical signal representative of the angular position of a vehicle wheel.

2. Apparatus according to claim 1, wherein at least one pivoting block (P) comprises a pair of drive rollers for a vehicle wheel, adapted to drive said wheel in rotation so as to effect automatically a wheel alignment during operation of the device.

3. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and four measuring arms (100, 101, 102, 103; 110, 111, 112, 113) of which each is secured to a vehicle wheel, and of which at least one arm comprises a block camera (104–107, 114–117, FIG. 25, FIG. 26, FIG. 29) provided with a multi-directional optical receiver and with a multi-directional light source or several unidirectional light sources;

wherein at least one said measuring arm (100–103, 110–113) is separable from a casing fixed to the wheel to be again fixed to another casing of a wheel or on the other side of the same casing, so as to provide a measuring arm (100–103, 110–113) as desired inwardly or outwardly of the vehicle as a function of the size of the vehicle.

4. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:
 a) gathering identification information (1, FIG. 5) of the vehicle and/or the customer,
 b) actuating a database (2, FIG. 5) containing technical characteristics of the vehicle and validating the corresponding information as to the vehicle to be inspected,
 c) effectuating a visual inspection (3, FIG. 5),
 d) emplacing and securing fixedly to the wheels of the vehicle measuring casings or measuring arms,
 e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle;

wherein said program is predetermined for allowing the wheel alignment to be effected automatically by the control of rollers for driving in rotation a wheel of the vehicle.

5. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:
 a) gathering identification information (1, FIG. 5) of the vehicle and/or the customer,
 b) actuating a database (2, FIG. 5) containing technical characteristics of the vehicle and validating the corresponding information as to the vehicle to be inspected,
 c) effectuating a visual inspection (3, FIG. 5),
 d) emplacing and securing fixedly to the wheels of the vehicle measuring casings or measuring arms,
 e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle;

wherein said program is predetermined for allowing the correction of the vehicle position to be effected automatically by traction and holding members acting on the body of the vehicle.

6. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:

a) gathering identification information (1, FIG. 5) of the vehicle and/or the customer, b) actuating a database (2, FIG. 5) containing technical characteristics of the vehicle and validating the corresponding information as to the vehicle to be inspected, c) effectuating a visual inspection (3, FIG. 5), d) emplacing and securing fixedly to the wheels of the vehicle measuring casings or measuring arms, e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle;

wherein said program is predetermined for allowing the steering of the steering wheel to be controlled by the computer according to an angular variation of a predetermined angle of steering in a given direction (FIG. 9B) and in the direction (FIG. 9D, FIG. 9E) opposite to said given direction.

7. Apparatus according to claim 6, wherein said program is predetermined for allowing the steering of the steering wheel to be controlled according to a predetermined speed of angular variation of steering (FIG. 9C, FIG. 9F) in the vicinity of the ends of the complete steering range.

8. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:

a) gathering identification information (1, FIG. 5) of the vehicle and/or the customer, b) actuating a database (2, FIG. 5) containing technical characteristics of the vehicle and validating the corresponding information as to the vehicle to be inspected, c) effectuating a visual inspection (3, FIG. 5), d) emplacing and securing fixedly to the wheels of the vehicle measuring casings or measuring arms, e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle;

wherein said program is predetermined for allowing a geometric balance (FIG. 10) to be automatically communicated to the operator by technical communication means (30) upon the completion of said step e).

9. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:

a) gathering identification information (1, FIG. 5) of the vehicle and/or the customer, b) actuating a database (2, FIG. 5) containing technical characteristics of the vehicle and validating the corresponding information as to the vehicle to be inspected, c) effectuating a visual inspection (3, FIG. 5), d) emplacing and securing fixedly to the wheels of the vehicle measuring casings or measuring arms, e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle, f) effecting a wheel alignment (FIG. 7) assisted by a computer and a computer-assisted correction of vehicle position (FIG. 8A, FIG. 8B), and g) adjusting the physical and geometric characteristics of the vehicle assisted by instructions communicated by a computer which communicates simultaneous information (FIG. 10A, FIG. 10B) representative of variations of said physical and geometric characteristics in real time during said adjustment.

10. Apparatus according to claim 9, wherein said program is predetermined for allowing to adjust the setback of the wheels of the front axle ("front setback") or the setback of the wheels of the rear axle ("rear setback").

11. Apparatus according to claim 9, wherein said program further performing the steps of calibration (FIG. 11A–FIG. 13) assisted by computer, of the zero positions of the detectors and of computer assisted variation (FIG. 14) of the gains of the detectors.

12. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:

a) gathering identification information (1, FIG. 5) of the vehicle and/or the customer, b) actuating a database (2, FIG. 5) containing technical characteristics of the vehicle and validating the corresponding information as to the vehicle to be inspected, c) effectuating a visual inspection (3, FIG. 5), d) emplacing and securing fixedly to the wheels of the vehicle measuring casings or measuring arms, e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle;

wherein said program further performs the step of computer-assisted calibration (FIG. 15–FIG. 19) of the geometrical characteristics of a raising bridge or workstation supporting the vehicle.

13. Apparatus for geometric inspection of wheeled vehicles, comprising:

at least two casings facing each other and each comprising at least one light source and at least one optical receiver located behind a means for defining an image, said means being sensitive to radiation from the light source of the other opposite casing, the light source (12) of a first casing defining with the optical receiver (13) of a second opposite casing a first active spatial zone (A), the light source (8) of said second casing defining with the optical receiver (14) of said first casing a second active spatial zone (B) and the two said active spatial zones (A, B) being separated by a space (C) of predetermined width (d) in such a way that the first active spatial zone (A) does not intersect the second active spatial zone (B), thus permitting simultaneous operation of the two casings without mutual interference; and a computer with a memory containing a program, wherein the program performs the following steps:

a) gathering identification information (1, FIG. 5) of the vehicle and/or the customer, b) actuating a database (2, FIG. 5) containing technical characteristics of the vehicle and validating the corresponding information as to the vehicle to be inspected, c) effectuating a visual inspection (3, FIG. 5), d) emplacing and securing fixedly to the wheels of the vehicle measuring casings or measuring arms, e) effecting a geometric report (4, FIG. 5) comprising a computer assisted wheel alignment (FIG. 7), an assisted correction of vehicle position (FIG. 8A, FIG. 8B) by computer, a centering of the direction assisted by computer and a direct or assisted steering of the axle (FIG. 9A–FIG. 9G) by computer so as to determine automatically the geometric balance (FIG. 10) of the vehicle; wherein the apparatus uses device comprising at least one block camera (104–107, 114–117, FIG. 26, FIG. 29) with several masks or several slots or several image definition means, wherein said program further performs the steps of measuring and of dimensional inspection of the body of the vehicle.

14. Apparatus according to claim 13, wherein at least three block cameras (104–107, 114–117, FIG. 26, FIG. 29) are secured to a predetermined reference base.

15. Apparatus according to claim 13, wherein at least one block camera (FIG. 29) comprises a mask having two slots defining a cross, so as to measure angles and distances to the horizontal and to the vertical.

16. Apparatus according to claim 14, wherein said program is predetermined for allowing the environment of the vehicle to be calibrated, to select a reference base or to verify the geometry of a predetermined reference base.

17. Apparatus according to claim 13, wherein a light emitter is secured in fixed known relation relative to a reference point to be inspected.

18. Apparatus according to claim 13, wherein a retroreflector (FIG. 31) of polyhedral shape is secured in fixed known relation relative to a reference point to be inspected.

19. Apparatus for geometric inspection of wheeled vehicles, comprising at least two casings facing each other and each comprising at least one light source and at least one optical receiver located behind a means for defining an image, said means being sensitive to radiation from the light source of the other opposite casing; and a central unit (25,UC) connected by communication means to measuring casings (21, 22; 40, 41) or measuring arms (26, 27; 42, 43); wherein at least one said casing or arm (42, 43; 100, 101; 110, 111) is connected to and communicates with a wheel pivoting plate (P) supplying an outlet electrical signal representative of the angular position of a vehicle wheel.

20. Apparatus for geometric inspection of wheeled vehicles, comprising at least two casings facing each other and each comprising at least one light source and at least one optical receiver located behind a means for defining an image, said means being sensitive to radiation from the light source of the other opposite casing; further comprising four measuring arms of which each is secured to a vehicle wheel, and of which at least one arm comprises a block camera provided with a multi-directional optical receiver and with a multi-directional light source or several unidirectional light sources, wherein at least one said measuring arm (100–103, 110–113) is separable from a casing fixed to the wheel to be again fixed to another casing of a wheel or on the other side of the same casing, so as to provide said measuring arm (100–103, 110–113) as desired inwardly or outwardly of the vehicle as a function of the size of the vehicle.

* * * * *